(12) United States Patent
Kawai

(10) Patent No.: US 10,778,880 B2
(45) Date of Patent: Sep. 15, 2020

(54) IMAGING DEVICE, IMAGING METHOD, AND IMAGING PROGRAM

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/406,729

(22) Filed: May 8, 2019

(65) Prior Publication Data

US 2019/0268530 A1 Aug. 29, 2019

Related U.S. Application Data

(63) Continuation of application No. PCT/JP2017/037240, filed on Oct. 13, 2017.

(30) Foreign Application Priority Data

Nov. 9, 2016 (JP) .................................. 2016-219037

(51) Int. Cl.
*H04N 5/232* (2006.01)
*H04N 5/225* (2006.01)
(Continued)

(52) U.S. Cl.
CPC ........... *H04N 5/23212* (2013.01); *G02B 7/04* (2013.01); *G02B 7/36* (2013.01); *G03B 13/36* (2013.01);
(Continued)

(58) Field of Classification Search
CPC .... H04N 5/23212; H04N 5/225; H04N 5/232; H04N 5/341; H04N 9/07; H04N 5/2254;
(Continued)

(56) References Cited

U.S. PATENT DOCUMENTS

2010/0194922 A1 8/2010 Honda et al.
2011/0058070 A1* 3/2011 Awazu ............... H04N 5/23212
348/241
(Continued)

FOREIGN PATENT DOCUMENTS

JP 2010-206769 A 9/2010
JP 2012-147187 A 8/2012
(Continued)

OTHER PUBLICATIONS

International Preliminary Report on Patentability and Written Opinion of the International Searching Authority (forms PCT/IB/373, PCT/ISA/237 and PCT/IB/326), dated May 23, 2019, for corresponding International Application No. PCT/JP2017/037240, with a Written Opinion translation.
(Continued)

*Primary Examiner* — Abdelaaziz Tissire
(74) *Attorney, Agent, or Firm* — Birch, Stewart, Kolasch & Birch, LLP.

(57) ABSTRACT

An imaging device includes: an imaging element as defined herein; a drive control unit as defined herein; an image processing unit as defined herein; a display-image data generation unit as defined herein; and a display control unit as defined herein, and the drive control unit reads out imaging signals from a plurality of pairs including the first photoelectric conversion units and the second photoelectric conversion units and a plurality of the third photoelectric conversion units in the first field period and reads out imaging signals from a plurality of the third photoelectric conversion units in the next field period.

31 Claims, 14 Drawing Sheets

(51) Int. Cl.
*G02B 7/04* (2006.01)
*G03B 13/36* (2006.01)
*G02B 7/36* (2006.01)
*H04N 5/341* (2011.01)
*H04N 9/07* (2006.01)
*G03B 17/18* (2006.01)

(52) U.S. Cl.
CPC ............ *G03B 17/18* (2013.01); *H04N 5/225* (2013.01); *H04N 5/2254* (2013.01); *H04N 5/232* (2013.01); *H04N 5/23229* (2013.01); *H04N 5/23245* (2013.01); *H04N 5/341* (2013.01); *H04N 9/07* (2013.01)

(58) Field of Classification Search
CPC .......... H04N 5/23229; H04N 5/23245; H04N 5/232122; H04N 5/36961; H04N 9/04551; G03B 13/36; G03B 17/18; G03B 13/20; G02B 7/36; G02B 7/04; G02B 7/34–346
See application file for complete search history.

(56) References Cited

U.S. PATENT DOCUMENTS

| | | | | |
|---|---|---|---|---|
| 2011/0310266 A1* | 12/2011 | Kato | ................. | H04N 5/23212 348/222.1 |
| 2012/0026358 A1* | 2/2012 | Hirose | .................... | G02B 7/28 348/226.1 |
| 2013/0162780 A1* | 6/2013 | Kurahashi | ........... | H04N 5/3572 348/46 |
| 2013/0182082 A1* | 7/2013 | Hayashi | ............. | H04N 5/23258 348/49 |
| 2014/0340565 A1 | 11/2014 | Kitani et al. | | |
| 2015/0042869 A1* | 2/2015 | Hoda | ..................... | G03B 13/36 348/350 |
| 2015/0092098 A1* | 4/2015 | Konishi | ............... | H04N 5/2352 348/333.11 |
| 2015/0215554 A1* | 7/2015 | Toyoguchi | .......... | H04N 5/3696 348/301 |
| 2015/0373251 A1 | 12/2015 | Haneda | | |
| 2016/0044231 A1* | 2/2016 | Nishizawa | ......... | H04N 5/23212 348/349 |
| 2016/0198105 A1* | 7/2016 | Kawai | .................... | G03B 13/36 348/251 |
| 2016/0219237 A1* | 7/2016 | Kobayashi | ............. | H04N 5/378 |

FOREIGN PATENT DOCUMENTS

| | | |
|---|---|---|
| JP | 2013-255188 A | 12/2013 |
| JP | 2014-241577 A | 12/2014 |
| JP | 2015-114544 A | 6/2015 |
| JP | 2016-5189 A | 1/2016 |

OTHER PUBLICATIONS

International Search Report (form PCT/ISA/210), dated Dec. 26, 2017, for corresponding International Application No. PCT/JP2017/037240, with an English translation.

* cited by examiner

IMAGING DEVICE, IMAGING METHOD, AND IMAGING PROGRAM

CROSS REFERENCE TO RELATED APPLICATION

This is a continuation of International Application No. PCT/JP2017/037240 filed on Oct. 13, 2017, and claims priority from Japanese Patent Application No. 2016-219037 filed on Nov. 9, 2016, the entire disclosures of which are incorporated herein by reference.

BACKGROUND OF THE INVENTION

1. Field of the Invention

The present invention relates to an imaging device, an imaging method, and a computer readable medium storing an imaging program.

2. Description of the Related Art

In recent years, with high resolution of an imaging element such as a charge coupled device (CCD) image sensor or a complementary metal oxide semiconductor (CMOS) image sensor, a demand for information devices having an imaging function such as an electronic endoscope, a digital still camera, a digital video camera, or a mobile phone with a camera has been rapidly increasing. The information device having the imaging function as described above is referred to as an imaging device.

Among such imaging devices, an imaging device has an imaging element including a phase-difference detection pixel mounted therein and adjusts the focal point in an imaging optical system based on an output signal of the phase-difference detection pixel (see JP2014-241577A and JP2016-005189A).

In a moving-image capturing mode in which a moving image is stored, the imaging device disclosed in JP2014-241577A performs a drive of reading out a signal from a pixel group including the phase-difference detection pixel and then continuously performs a drive of reading out a signal from the remaining pixel group, when reading out a captured image signal for one frame from the imaging element. According to the imaging device, it is possible to adjust the focal point in the imaging optical system based on the signal read out in the first drive. Thus, it is possible to perform imaging for each frame with performing focusing on a subject.

SUMMARY OF THE INVENTION

A postview function is mounted in the imaging device. The postview function displays a checking image (postview image) for checking captured image data obtained by still image capturing, in a display unit in a case where the still image capturing is performed.

In the imaging device having a postview function, in a case where a still image having a high resolution is desired to be stored, time elapses until the checking image is displayed, and thus blackout occurs in the display unit for a long period. In particular, in a continuous shooting mode in which still images are consecutively stored, in a case where a period in which blackout occurs becomes long, visibility of the postview image is decreased.

In the imaging device disclosed in JP2014-241577A, in the moving-image capturing mode, a signal read out from the pixel group including the phase-difference detection pixel in the first drive is not used for storing and displaying, and a signal read out from a pixel group which does not include the phase-difference detection pixel, in the next drive, is used for storing and displaying.

Therefore, the resolution of each frame in a moving image to be stored is decreased by the pixel group including the phase-difference detection pixel. In a case where a drive of reading out the signal from the pixel group including the phase-difference detection pixel is earlier performed, the signal is not used for displaying. Thus, time elapses from an end of imaging one frame of a moving image until a checking image of this one frame is displayed.

In the imaging device disclosed in JP2016-005189A, the signal read out from the pixel group including the phase-difference detection pixel is not used for storing. Therefore, it is not possible to store a still image or a moving image with a high resolution.

The present invention has been made in view of the above circumstances, and an object of the present invention is to provide an imaging device, an imaging method, and a computer readable medium storing an imaging program in which it is possible to store captured image data having a high resolution and to allow immediate checking of the captured image data in the display unit.

According to the present invention, an imaging device comprises an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens, a drive control unit that performs, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an image processing unit that processes the imaging signal group read out from the imaging element so as to generate captured image data and stores the captured image data in a storage medium, a display-image data generation unit that processes a first imaging signal group read out from the imaging element in a first field period among the plurality of field periods, so as to generate first display image data and processes a second imaging signal group read out from the imaging element in a field period next to the first field period, so as to generate second display image data, and a display control unit that displays a first image based on the first display image data in the display unit and then changes the first image to a second image based on the second display image data. The drive control unit reads out imaging signals from a plurality of pairs including the first photoelectric conversion units and the second photoelectric conversion units and a plurality of the third photoelectric conversion units in the first field period and reads out imaging signals from a plurality of the third photoelectric conversion units in the next field period.

According to the present invention, there is provided an imaging method of imaging a subject with an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens. The method comprises a drive control step of performing, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an imaging processing step of processing the imaging signal group read out from the imaging element so as to generate captured image data and storing the captured image data in a storage medium, a display-image data generation step of processing a first imaging signal group read out from the imaging element in a first field period among the plurality of field periods, so as to generate first display image data and processing a second imaging signal group read out from the imaging element in a field period next to the first field period, so as to generate second display image data, and a display control step of displaying a first image based on the first display image data in the display unit and then changing the first image to a second image based on the second display image data. In the drive control step, imaging signals are read out from a plurality of pairs including the first photoelectric conversion units and the second photoelectric conversion units and a plurality of the third photoelectric conversion units in the first field period, and imaging signals are read out from a plurality of the third photoelectric conversion units in the next field period.

According to the present invention, there is provided an imaging program which is used for imaging a subject with an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens. The program causes a computer to execute: a drive control step of performing, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an imaging processing step of processing the imaging signal group read out from the imaging element so as to generate captured image data and storing the captured image data in a storage medium, a display-image data generation step of processing a first imaging signal group read out from the imaging element in a first field period among the plurality of field periods, so as to generate first display image data and processing a second imaging signal group read out from the imaging element in a field period next to the first field period, so as to generate second display image data, and a display control step of displaying a first image based on the first display image data in the display unit and then changes the first image to a second image based on the second display image data. In the drive control step, imaging signals are read out from a plurality of pairs including the first photoelectric conversion units and the second photoelectric conversion units and a plurality of the third photoelectric conversion units in the first field period, and imaging signals are read out from a plurality of the third photoelectric conversion units in the next field period.

According to the present invention, it is possible to provide an imaging device, an imaging method, and an imaging program in which it is possible to store captured image data having a high resolution and to allow immediate checking of the captured image data in the display unit.

DESCRIPTION OF THE PREFERRED EMBODIMENTS

Hereinafter, embodiments of the present invention will be described with reference to the drawings.

Figure 1:
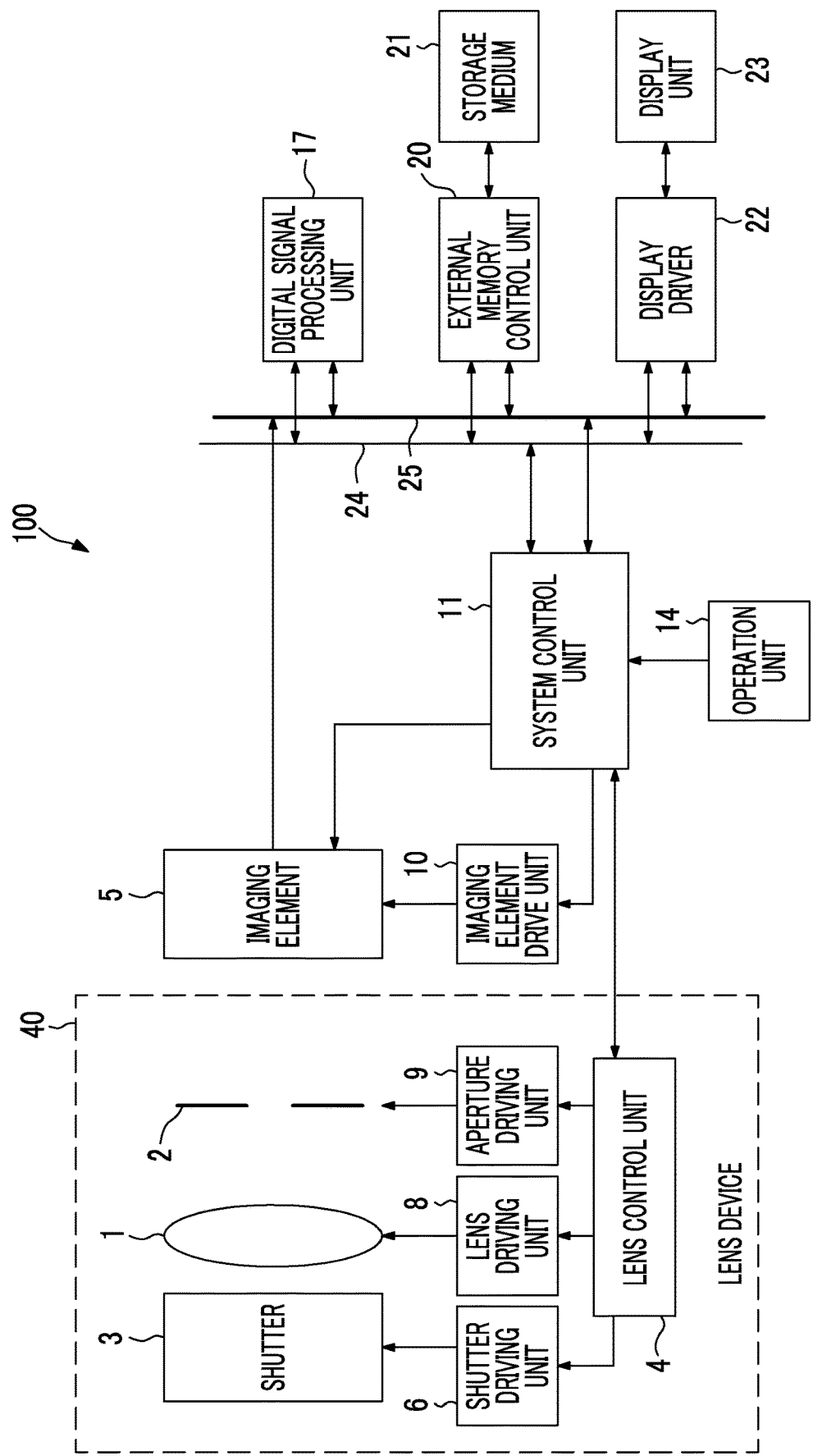
FIG. 1 is a schematic diagram illustrating a configuration of a digital camera 100 as an embodiment of an imaging device according to the present invention.

FIG. 1 is a schematic diagram illustrating a configuration of a digital camera 100 as an embodiment of an imaging device according to the present invention.

The digital camera 100 comprises a lens device 40 including an imaging lens 1, an aperture 2, a mechanical shutter 3, a lens control unit 4, a shutter driving unit 6, a lens driving unit 8, and an aperture driving unit 9.

In the embodiment, the lens device 40 is described as being attachable to and detachable from a main body of the digital camera 100, but may be fixed to the main body of the digital camera 100.

The imaging lens 1 and the aperture 2 constitute an imaging optical system, and the imaging optical system includes, for example, a focus lens or the like.

The focus lens is a lens for adjusting a focal point of an imaging optical system, and is configured with a single lens or a plurality of lenses. The focal point of the imaging optical system is adjusted by moving the focus lens in an optical axis direction of the imaging optical system.

A liquid lens capable of changing the focal position by variably controlling the curved surface of the lens may be used as the focus lens.

The mechanical shutter 3 is a shutter mechanism that performs mechanical switching between a state in which light enters into the imaging element 5 and a state in which no light enters into the imaging element 5. In the example of FIG. 1, the mechanical shutter 3 is disposed to be closer to the subject side than to the imaging optical system.

The mechanical shutter 3 may be disposed in front of the imaging element 5 (on the subject side). For example, the mechanical shutter 3 may be disposed between the imaging element 5 and the imaging optical system. Descriptions will be made below on the assumption that the mechanical shutter 3 is a focal plane shutter configured with a leading curtain and a trailing curtain.

The lens control unit 4 of the lens device 40 is configured to be capable of communicating with a system control unit 11 in the main body of the digital camera 100 by wire or wirelessly.

The lens control unit 4 opens or closes the mechanical shutter 3 via the shutter driving unit 6, controls the focus lens included in the imaging lens 1 via the lens driving unit 8, or drives the aperture 2 via the aperture driving unit 9, in accordance with a command from the system control unit 11.

The main body of the digital camera 100 comprises a MOS type imaging element 5 such as a CMOS image sensor that images a subject with the imaging optical system, an imaging element driving unit 10 that drives the imaging element 5, a system control unit 11 that performs overall control of an entire electrical control system of the digital camera 100, and an operation unit 14.

The system control unit 11 includes various processors, a random access memory (RAM), and a read only memory (ROM), and totally controls the entire digital camera 100. A program including an imaging program is stored in the ROM.

The various processors include a central processing unit (CPU) which is a general-purpose processor that executes a program to perform various processes, a programmable logic device (PLD) that is a processor of which a circuit configuration can be changed after a field programmable gate array (FPGA) is manufactured, and a dedicated electric circuit that is a processor having a circuit configuration designed to be dedicated to execute a specific process, such as an application specific integrated circuit (ASIC).

More specifically, structures of the various processors are electric circuits in which circuit elements such as semiconductor elements are combined.

The processor of the system control unit 11 may be constituted by one of various processors, or may be constituted by a combination of two or more of the same or different types of processors (for example, a combination of a plurality of FPGAs or a combination of a CPU and an FPGA).

Further, the electrical control system of the digital camera 100 comprises a digital signal processing unit 17, an external memory control unit 20, and a display driver 22. The digital signal processing unit 17 performs an interpolation operation, a gamma correction operation, a RGB/YC conversion processing, and the like on an imaging signal group output from the imaging element 5 to a data bus 25 so as to generate captured image data for recording and display image data. The external memory control unit 20 is connected to a detachable storage medium 21. The display driver 22 drives a display unit 23 such as an organic electroluminescence (EL) display or a liquid crystal display (LCD), which is mounted on the back side of the digital camera 100 or in an electronic viewfinder.

The digital signal processing unit 17 includes the various processors, the RAM, and the ROM described above, and performs various processing by the processor executing the program stored in the ROM. The program includes the imaging program.

The processor of the digital signal processing unit 17 may be constituted by one of various processors, or may be constituted by a combination of two or more of the same or different types of processors (for example, a combination of a plurality of FPGAs or a combination of a CPU and an FPGA).

The digital signal processing unit 17, the external memory control unit 20, and the display driver 22 are connected to each other via a control bus 24 and a data bus 25, and operate on the basis of a command from the system control unit 11.

Figure 2:
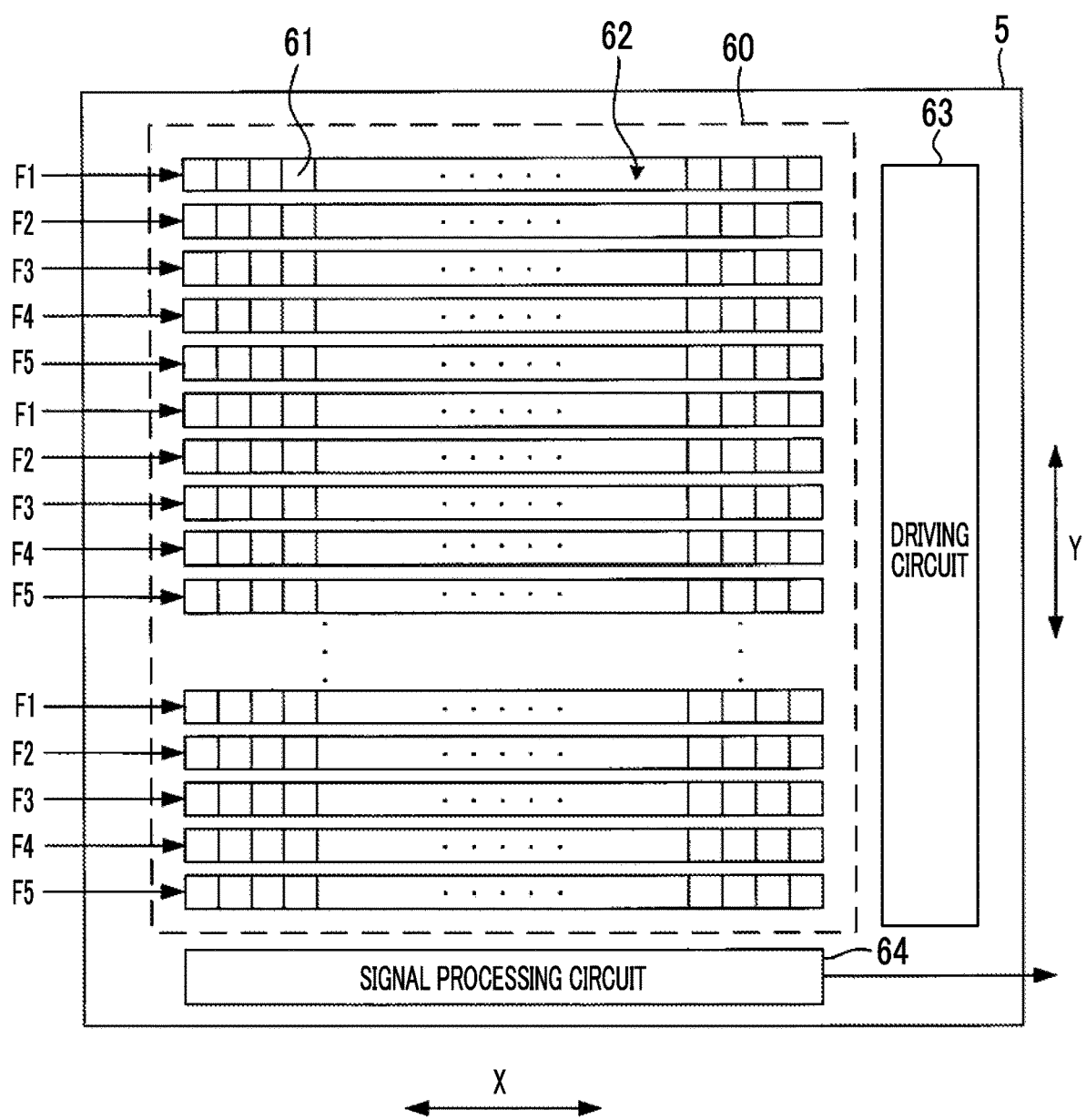
FIG. 2 is a schematic plan view illustrating a configuration of an imaging element 5 illustrated in FIG. 1.

FIG. 2 is a schematic plan view illustrating a configuration of the imaging element 5 illustrated in FIG. 1.

The imaging element 5 comprises a light reception surface 60, a driving circuit 63, and a signal processing circuit 64. On the light reception surface 60, a plurality of pixel rows 62 including a plurality of pixels 61 arranged in a row direction X as one direction is arranged in a column direction Y perpendicular to the row direction X. The driving circuit 63 drives the pixels arranged on the light reception surface 60. The signal processing circuit 64 processes an imaging signal read out from each pixel 61 of the pixel row 62 arranged on the light reception surface 60.

Figure 3:
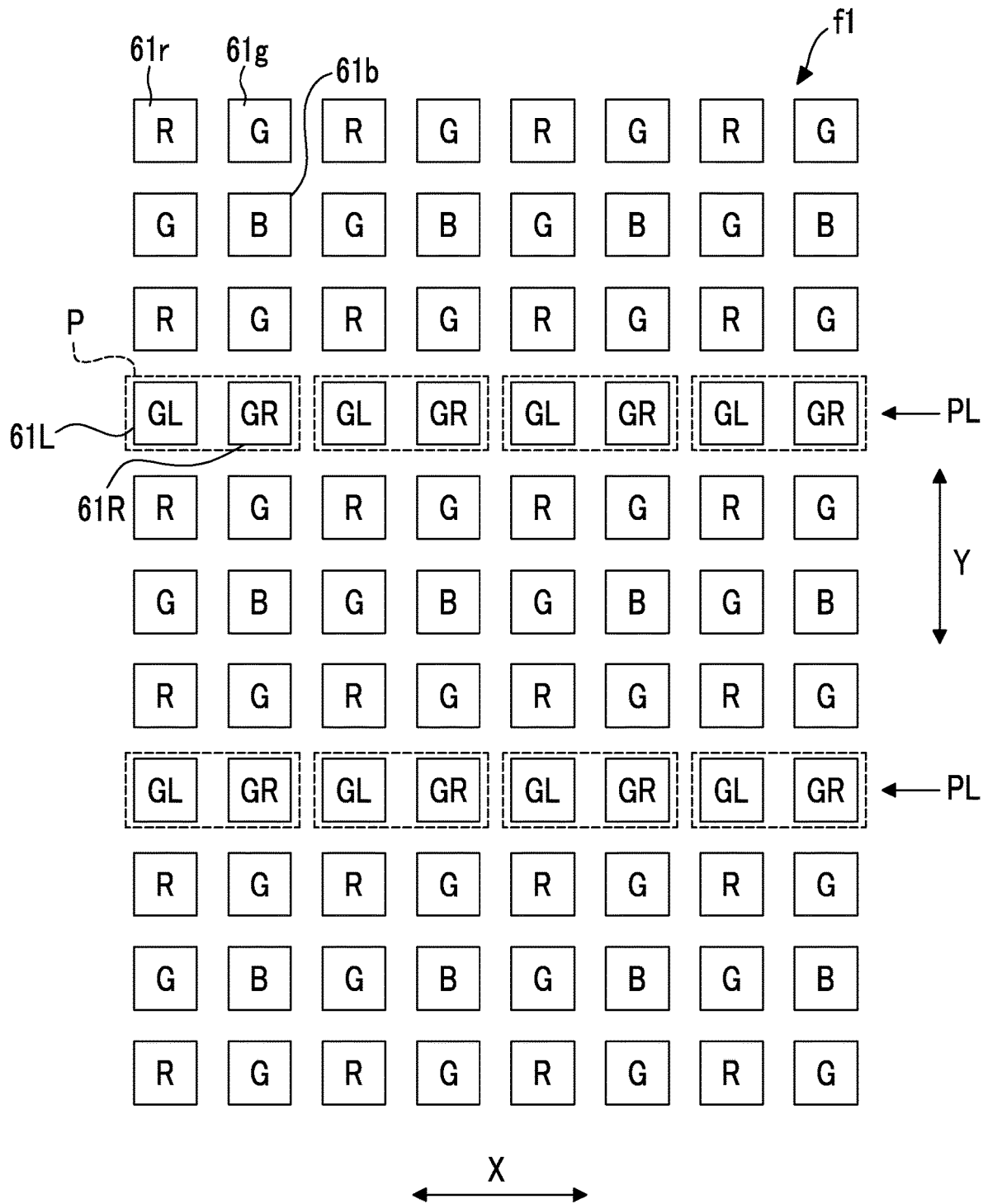
FIG. 3 is a diagram partially illustrating pixel arrangement of a pixel group f1 in the imaging element 5 illustrated in FIG. 2.

Hereinafter, an upward end in the column direction Y of the light reception surface 60 in FIG. 3 is referred to as an upper end, and a downward end in the column direction Y of the light reception surface 60 is referred to as a lower end.

The pixel 61 includes a photoelectric conversion unit, a color filter, and a readout circuit. The photoelectric conversion unit receives light passing through the imaging optical system of the lens device 40 and generates and accumulates charges in accordance with the amount of received light. The color filter is formed over the photoelectric conversion unit. The readout circuit converts the charges accumulated in the photoelectric conversion unit into a voltage signal and reads the voltage signal as an imaging signal out to a signal line. A well-known configuration can be adopted for the readout circuit.

The readout circuit includes, for example, a transfer transistor for transferring the charge accumulated in the photoelectric conversion unit to a floating diffusion, a reset transistor for resetting a potential of the floating diffusion, an output transistor that outputs a voltage signal according to the potential of the floating diffusion, and a selection transistor for selectively reading out the voltage signal output from the output transistor to the signal line. It should be noted that the readout circuit may be shared by a plurality of photoelectric conversion units.

The color filter mounted on the plurality of pixels 61 formed on the light reception surface 60 is arranged in accordance with the Bayer pattern. In the imaging element 5, spectroscopy is performed by the color filter. However, spectroscopy may be performed in the photoelectric conversion unit itself without using the color filter.

Five fields F1 to F5 are set in the light reception surface 60.

In a case where M is set to an integer of 0 or more, the number of fields set in the light reception surface 60 is set as n (here, n=5), k is set to 1 to n, a region in which the (n×M+k)th pixel row 62 from the upper end side of the light reception surface 60 among all the pixel rows 62 arranged on the light reception surface 60 is disposed is set to be a field Fk. A group including pixels 61 in the field Fk is referred to as a pixel group fk below. That is, a pixel group f1, a pixel group f2, a pixel group f3, a pixel group f4, and a pixel group f5 are formed in the light reception surface 60.

The driving circuit 63 drives the readout circuit connected to the photoelectric conversion unit of each pixel 61 in a unit of the pixel row 62, for example, so as to reset each photoelectric conversion unit included in the pixel row 62 for each pixel row 62 and to read a voltage signal depending on charges accumulated in each photoelectric conversion unit out to the signal line. The driving circuit 63 is controlled by the imaging element driving unit 10.

The signal processing circuit 64 performs correlative double sampling processing on the imaging signal read out from each pixel 61 of the pixel row 62 to the signal line, converts the imaging signal subjected to the correlative double sampling processing into a digital signal, and outputs the digital signal.

The plurality of pixels 61 formed in the light reception surface 60 of the imaging element 5 includes an imaging pixel and a phase-difference detection pixel.

In the imaging element 5, in the pixel group f1, some pixels 61 function as phase-difference detection pixels, and the remaining pixels 61 except for the some pixels function as imaging pixels. All pixels 61 included in the pixel groups f2 to f5 function as imaging pixels.

FIG. 3 is a diagram partially illustrating pixel arrangement of the pixel group f1 in the imaging element 5 illustrated in FIG. 2.

The pixel group f1 is constituted by an imaging pixel 61r, an imaging pixel 61g, an imaging pixel 61b, a phase-difference detection pixel 61R, and a phase-difference detection pixel 61L.

The phase-difference detection pixel 61R is a pixel including a first photoelectric conversion unit that receives one of a pair of luminance fluxes passing through portions which are different from each other and are arranged in the row direction X in a pupil region of the imaging optical system in the lens device 40, and generates and accumulates charges in accordance with the amount of received light. The first photoelectric conversion unit included in the phase-difference detection pixel 61R receives green light and generates and accumulates charges in accordance with the amount of received light, in the example in FIG. 3.

The phase-difference detection pixel 61L is a pixel including a second photoelectric conversion unit that receives the other of the pair of luminance fluxes and generates and accumulates charges in accordance with the amount of received light. The second photoelectric conversion unit included in the phase-difference detection pixel 61L receives green light and generates and accumulates charges in accordance with the amount of received light, in the example in FIG. 3. The first photoelectric conversion unit and the second photoelectric conversion unit may receive blue light or red light.

Each of the imaging pixel 61r, the imaging pixel 61g, and the imaging pixel 61b is a pixel including a third photoelectric conversion unit that receives both the pair of luminance fluxes and generates and accumulates charges in accordance with the amount of received light.

The third photoelectric conversion unit included in the imaging pixel 61r receives red light and generates and accumulates charges in accordance with the amount of received light.

The third photoelectric conversion unit included in the imaging pixel 61g receives green light and generates and accumulates charges in accordance with the amount of received light.

The third photoelectric conversion unit included in the imaging pixel 61b receives blue light and generates and accumulates charges in accordance with the amount of received light.

All pixels included in the pixel group f1 are arranged in accordance with the Bayer pattern. Some pixel rows among GB pixel rows obtained by alternately arranging the imaging pixel 61g and the imaging pixel 61b in the row direction X function as phase-difference detection pixel rows PL for detecting a phase difference.

The phase-difference detection pixel row PL is constituted by the phase-difference detection pixel 61L disposed at a position at which the imaging pixel 61g is to be disposed in the Bayer pattern and the phase-difference detection pixel 61R disposed at a position at which the imaging pixel 61b is to be disposed in the Bayer pattern.

In the phase-difference detection pixel row PL, the phase-difference detection pixel 61L and the phase-difference detection pixel 61R which is right adjacent to the phase-difference detection pixel 61L constitute a pair P. The phase-difference detection pixel row PL includes a plurality of pairs P.

A correlation operation between an imaging signal group read out from a plurality of phase-difference detection pixels 61L included in the phase-difference detection pixel row PL and an imaging signal group read out from a plurality of phase-difference detection pixels 61R is performed, and thereby a phase difference between a pair of subject images captured by the phase-difference detection pixel row PL can be detected.

A configuration in which not some pixel rows of the GB pixel rows function as the phase-difference detection pixel rows PL, and but some pixel rows of RG pixel rows in which the imaging pixel 61r and the imaging pixel 61g are alternately arranged in the row direction X function as the phase-difference detection pixel rows PL may be made.

In the example in FIG. 3, the phase-difference detection pixel row PL is configured with only the plurality of pairs P. However, the phase-difference detection pixel row PL may include the imaging pixel. For example, the imaging pixel may be disposed between the plurality of pairs P in the phase-difference detection pixel row PL.

Figure 4:
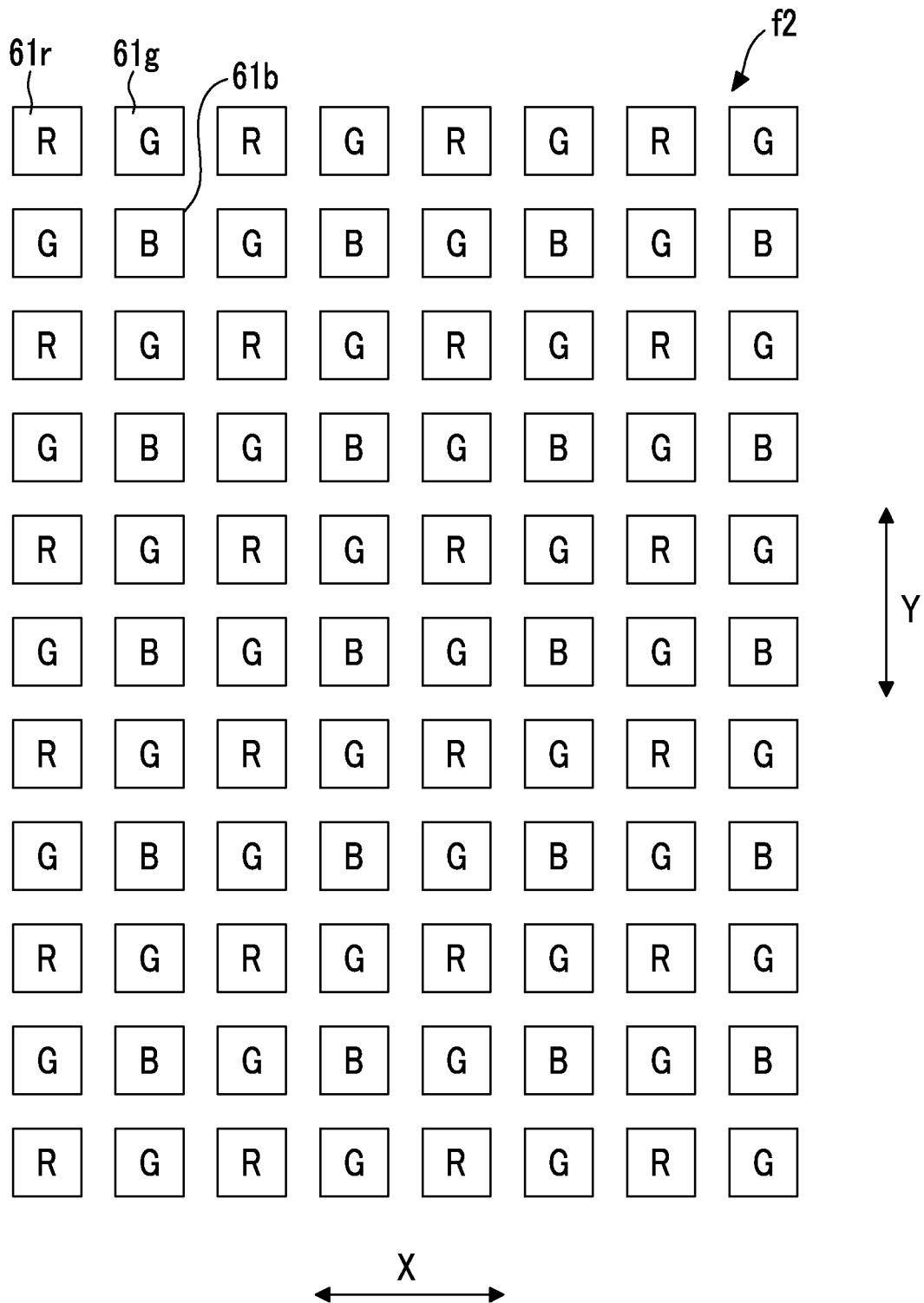
FIG. 4 is a diagram partially illustrating pixel arrangement of a pixel group f2 in the imaging element 5 illustrated in FIG. 2.

FIG. 4 is a diagram partially illustrating pixel arrangement of the pixel group f2 in the imaging element 5 illustrated in FIG. 2.

The pixel group f2 is configured by an imaging pixel 61r, an imaging pixel 61g, and an imaging pixel 61b and has a configuration in which the imaging pixel 61r, the imaging pixel 61g, and the imaging pixel 61b are arranged in accordance with the Bayer pattern.

The pixel arrangement of each of the pixel group f3 to the pixel group f5 is basically identical to that of the pixel group f2 except that a pixel row on the upper end side of the light reception surface 60 is the RG pixel row in which the imaging pixel 61r and the imaging pixel 61g are alternately arranged in the row direction X or the GB pixel row in which the imaging pixel 61g and the imaging pixel 61b are alternately arranged in the row direction X.

As described above, each of the pixel group f1 to the pixel group f5 is configured by a plurality of pixels arranged in accordance with the Bayer pattern. The number (value of n) of fields set in the light reception surface 60 is required to be an odd number of 3 or more in order that each pixel group formed in the light reception surface 60 is configured with a plurality of pixels arranged in accordance with the Bayer pattern.

Figure 5:
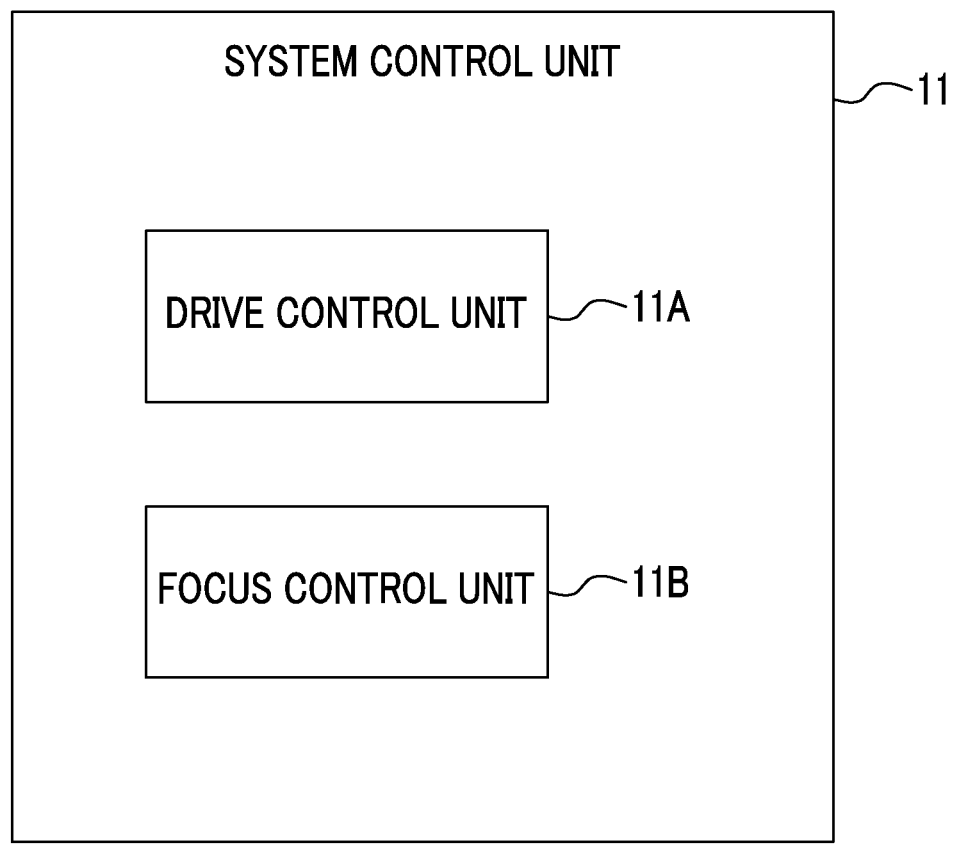
FIG. 5 is a functional block diagram illustrating a system control unit 11 illustrated in FIG. 1.

FIG. 5 is a functional block diagram illustrating the system control unit 11 illustrated in FIG. 1.

The processor of the system control unit 11 executes a program including the imaging program stored in the internal ROM so as to function as a drive control unit 11A and a focus control unit 11B.

The drive control unit 11A controls the imaging element driving unit 10 and the lens control unit 4 and controls the imaging element 5 to perform imaging for live view display and imaging for recording.

In a case where an imaging instruction of a still image is received, the drive control unit 11A controls the imaging element driving unit 10 and the lens control unit 4 to perform a drive control in accordance with the imaging instruction. In the drive control, each pixel 61 of the imaging element 5 is exposed for a predetermined period, and an imaging signal group (referred to as a still-image capturing signal group below) including an imaging signal obtained in a manner that the photoelectric conversion unit in each pixel 61 of the imaging element 5 performs photoelectric conversion by the exposure for the predetermined period is read out in n field periods. n is equal to the number of fields set in the light reception surface 60 of the imaging element 5. The field period corresponds to one period of a vertical synchronization signal.

Specifically, the drive control unit 11A reads the still-image capturing signal group from the imaging element 5 in a manner as follows. That is, the drive control unit performs a drive of reading an imaging signal from the pixel group f1 in the field F1 in a first field period among the n field periods. The drive control unit performs a drive of reading an imaging signal from the pixel group f2 in the field F2 in a second field period which is next to the first field period. The drive control unit performs a drive of reading an imaging signal from the pixel group f3 in the field F3 in a third field period which is next to the second field period. The drive control unit performs a drive of reading an imaging signal from the pixel group f4 in the field F4 in a fourth field period which is next to the third field period. The drive control unit performs a drive of reading an imaging signal from the pixel group f5 in the field F5 in a fifth field period which is next to the fourth field period.

The focus control unit 11B controls the focus lens based on the imaging signals read out from the phase-difference detection pixels 61R and 61L of the imaging element 5 to perform focus control of the imaging optical system in the lens device 40.

The digital camera in FIG. 1 has a single shot mode and a continuous shooting mode. In the single shot mode, the drive control is performed once in accordance with an imaging instruction, and thereby one captured image data is stored in the storage medium 21. In the continuous shooting mode, the drive control is continuously performed plural times in accordance with an imaging instruction, and thereby plural pieces of captured image data are stored in the storage medium 21.

In a state where the continuous shooting mode is set, before reading of the still-image capturing signal group by each drive control performed by the drive control unit 11A is completed, the focus control unit 11B controls the focus lens based on a first imaging signal read out from the phase-difference detection pixel 61R and a second imaging signal read out from the phase-difference detection pixel 61L among the imaging signals read out from the pixel group f1, to perform focus control of the imaging optical system in the lens device 40.

Specifically, the focus control unit 11B calculates a phase difference by performing a correlation operation between the first imaging signal and the second imaging signal and obtains a defocus quantity from the phase difference. The focus control unit transmits the defocus quantity to the lens control unit 4 and outputs a command to control the focal position of the focus lens.

The lens control unit 4 controls the focal position of the focus lens via the lens driving unit 8, in accordance with the above command. In this manner, the focus control is performed.

Figure 6:
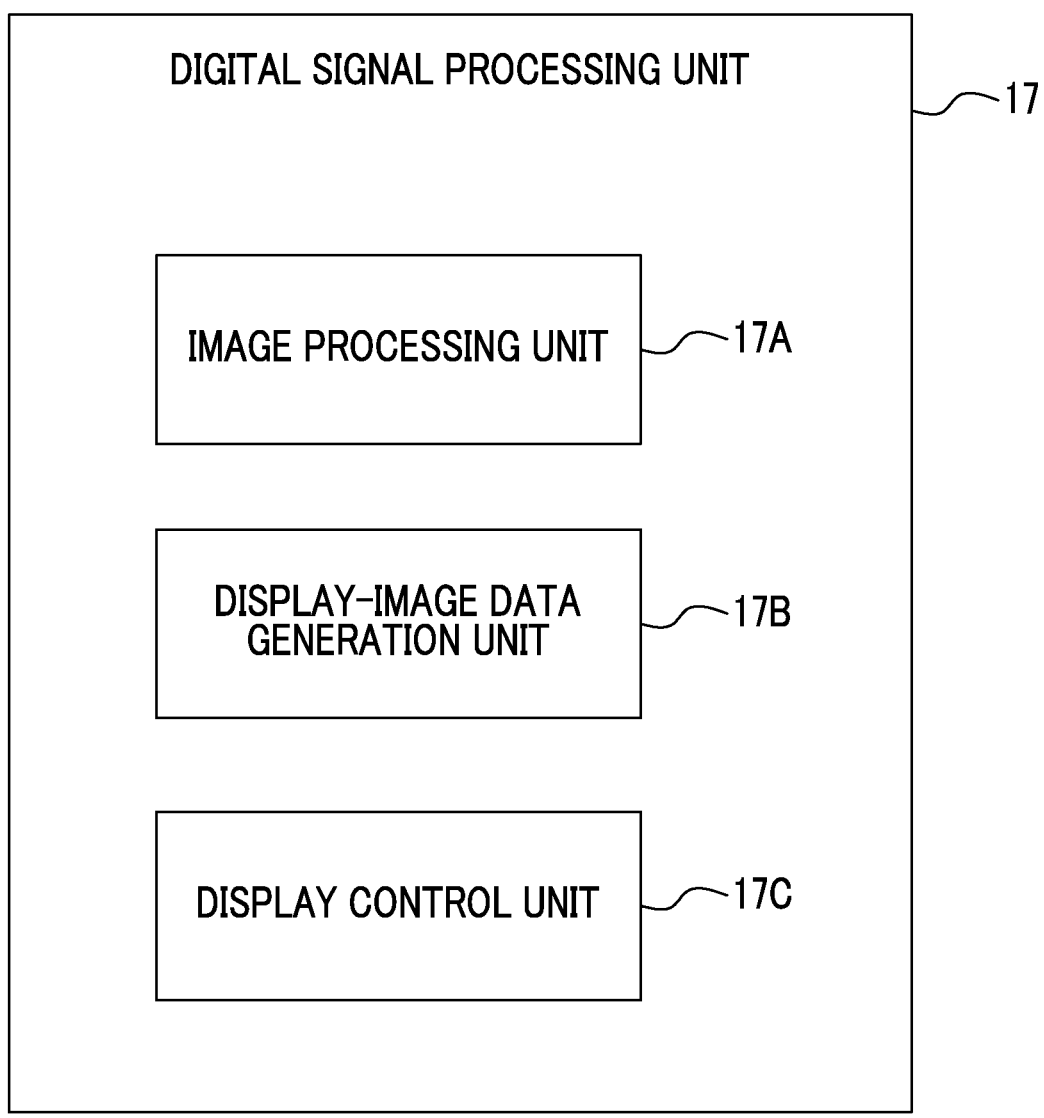
FIG. 6 is a functional block diagram illustrating a digital signal processing unit 17 illustrated in FIG. 1.

FIG. 6 is a functional block diagram illustrating the digital signal processing unit 17 illustrated in FIG. 1.

The processor of the digital signal processing unit 17 executes a program including the imaging program stored in the internal ROM so as to function as an image processing unit 17A, a display-image data generation unit 17B, and a display control unit 17C.

The image processing unit 17A processes the still-image capturing signal group read out from the imaging element 5 by the drive control so as to generate captured image data, and stores the generated captured image data in the storage medium 21.

The display-image data generation unit 17B processes the imaging signal group read out from the imaging element 5, to generate display image data for displaying a live-view image or a postview image.

In a case where the drive control is performed, the display-image data generation unit 17B processes a first imaging signal group read out from the pixel group f1 of the imaging element 5 in the first field period among the n field periods, so as to generate first display image data. Then, the display-image data generation unit processes a second imaging signal group read out from the pixel group f2 of the imaging element 5 in the second field period which is next to the first field period, so as to generate second display image data.

The display-image data generation unit 17B performs signal processing on the first imaging signal group read out from the pixel group f1 and generates the first display image data based on the first imaging signal group subjected to the signal processing. The signal processing is performed so that each of the first imaging signal read out from the phase-difference detection pixel 61R and the second imaging signal read out from the phase-difference detection pixel 61L in the first imaging signal group is treated as a signal read out from the imaging pixel.

As the signal processing performed by the display-image data generation unit 17B, for example, two kinds of processing as follows are exemplified.

(First Signal Processing)

The display-image data generation unit 17B replaces the first imaging signal read out from the phase-difference detection pixel 61R of the pixel group f1 with an imaging signal read out from an imaging pixel (imaging pixel that detects light of the same color detected by an imaging pixel to be disposed at the position of the phase-difference detection pixel 61R in accordance with the Bayer pattern) around the phase-difference detection pixel 61R in the pixel group f1 or with an imaging signal generated based on the above imaging signal.

The display-image data generation unit 17B replaces the second imaging signal read out from the phase-difference detection pixel 61L of the pixel group f1 with an imaging signal read out from an imaging pixel (imaging pixel that detects light of the same color detected by an imaging pixel to be disposed at the position of the phase-difference detection pixel 61L in accordance with the Bayer pattern) around the phase-difference detection pixel 61L or with a signal generated based on the above imaging signal.

For example, the display-image data generation unit 17B replaces the second imaging signal read out from a certain phase-difference detection pixel 61L in FIG. 3 with an average value of four imaging signals read out from four imaging pixels 61g which are closest to this phase-difference detection pixel 61L or with any one of the four imaging signals.

The display-image data generation unit 17B replaces the first imaging signal read out from a certain phase-difference detection pixel 61R in FIG. 3 with an average value of two imaging signals read out from two imaging pixels 61b which are closest up and down to this phase-difference detection pixel 61R or with any one of the two imaging signals.

(Second Signal Processing)

The display-image data generation unit 17B multiplies the first imaging signal read out from the phase-difference detection pixel 61R of the pixel group f1 by a first gain and multiplies the second imaging signal read out from the phase-difference detection pixel 61L of the pixel group f1 by a second gain.

The first gain is a ratio between the imaging signal read out from the phase-difference detection pixel 61R and the imaging signal read out from the imaging pixel 61b. The first gain is calculated in manufacturing and stored in the ROM of the digital signal processing unit 17.

The level of the first imaging signal can be treated as the imaging signal read out from the imaging pixel 61b, by multiplying the first imaging signal by the first gain.

The second gain is a ratio between the imaging signal read out from the phase-difference detection pixel 61L and the imaging signal read out from the imaging pixel 61g. The second gain is calculated in manufacturing and stored in the ROM of the digital signal processing unit 17.

The level of the second imaging signal can be treated as the imaging signal read out from the imaging pixel 61g, by multiplying the second imaging signal by the second gain.

The image processing unit 17A performs signal processing by which each of the first imaging signal read out from the phase-difference detection pixel 61R and the second imaging signal read out from the phase-difference detection pixel 61L is treated as a signal read out from the imaging pixel, on the still-image capturing signal group read out from the imaging element 5. Then, the image processing unit 17A processes the still-image capturing signal group subjected to the signal processing to generate captured image data.

In order to generate the first display image data having high quality by the signal processing, it is necessary that a condition that at least one pixel row constituted by only imaging pixels is provided between two phase-difference detection pixel rows PL adjacent to each other in the column direction Y in the pixel arrangement of the pixel group f1 illustrated in FIG. 3 is satisfied.

In order to satisfy the condition, in a case where m is set as a natural number of 2 or more, phase-difference detection pixel rows PL illustrated in FIG. 3 of which the number is {(n×m)−1} are arranged in the light reception surface 60.

In the digital camera 100 in FIG. 1, n is 5, m is 4, and 19 phase-difference detection pixel rows PL are arranged in the light reception surface 60. That is, 19 pixel rows 62 including only imaging pixels are provided between two phase-difference detection pixel rows PL which are disposed in the light reception surface 60 to be closest to each other.

The display control unit 17C transmits the display image data generated by the display-image data generation unit 17B to the display driver 22 and displays an image based on the display image data in the display unit 23.

The display image data is constituted by multiple pieces of pixel data. The display image data has a configuration in which a plurality of pixel data rows, each including plural pieces of pixel data arranged in the same direction as the row direction X, is arranged in a direction perpendicular to the row direction X.

The display control unit 17C sequentially transmits the display image data to the display driver 22 for each pixel data row and causes the display driver 22 to display an image based on the display image data in the display unit 23.

The display unit 23 has a display surface in which a plurality of display pixel rows, each includes a plurality of display pixels arranged in the same direction as the row direction X, is arranged in a direction perpendicular to the row direction X.

The display driver 22 draws one line of the image based on the pixel data row input from the display control unit 17C, in one display pixel row of the display unit 23. The display driver 22 draws all lines of the image in a manner that the drawing destination of one line of the image based on the pixel data row is shifted one by one every time the pixel data row is input.

Next, an operation of the digital camera 100 configured as described above will be described.

Figure 7:
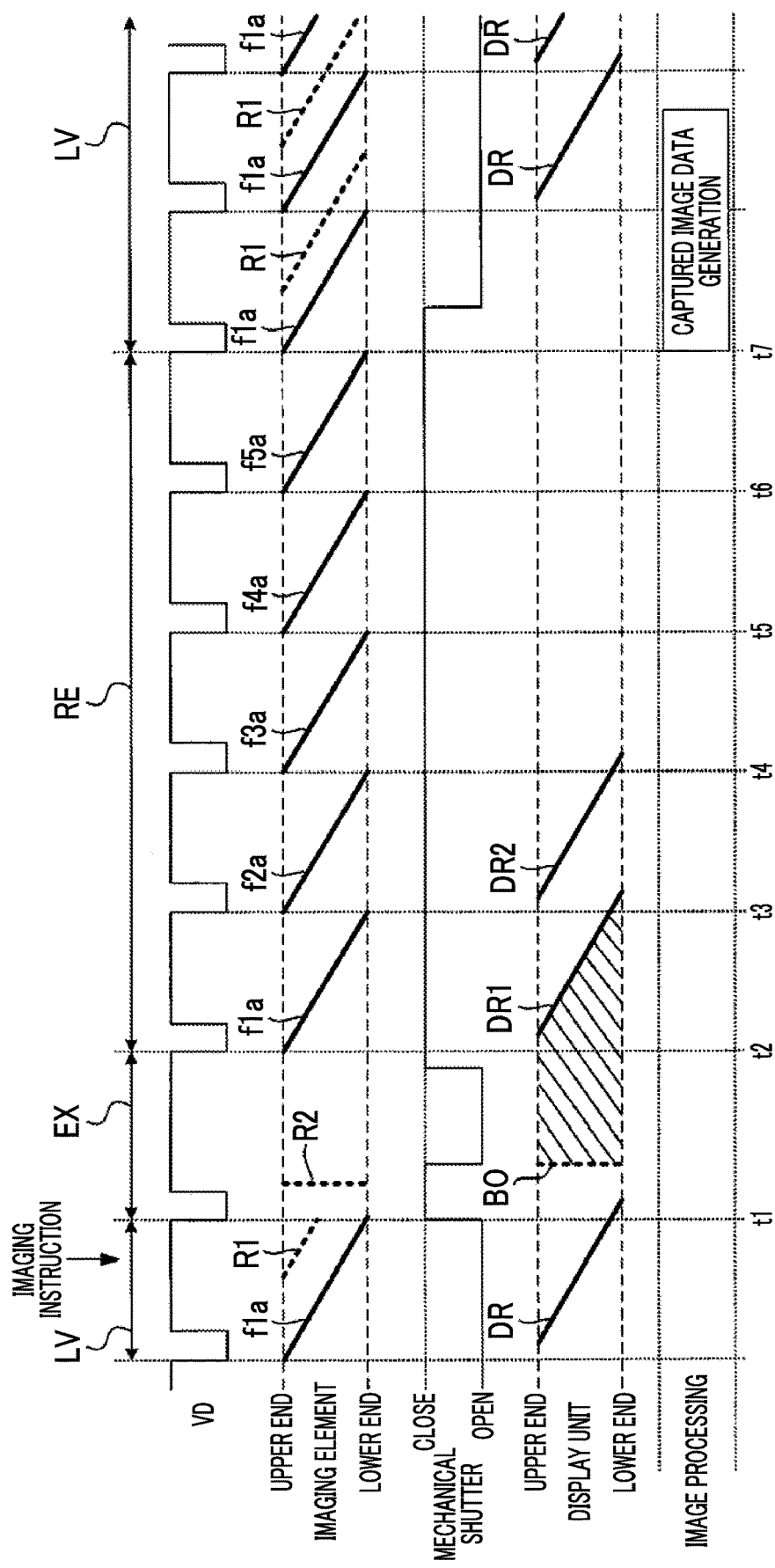
FIG. 7 is a timing chart illustrating an operation of the digital camera 100 illustrated in FIG. 1, in a single shot mode.

FIG. 7 is a timing chart illustrating the operation of the digital camera 100 illustrated in FIG. 1, in the single shot mode.

In FIG. 7, the state of the vertical synchronization signal is illustrated in a line of "VD".

In FIG. 7, a driving timing of each pixel row 62 in the light reception surface 60 of the imaging element 5 is illustrated in a line of "imaging element". A vertical axis indicates the position of the pixel row 62 in the column direction Y.

In FIG. 7, an open and close state of the mechanical shutter 3 is illustrated in a line of "mechanical shutter".

In FIG. 7, a drawing state of the display unit 23 is illustrated in a line of "display unit". A vertical axis indicates the position of the display pixel row in the display unit 23. The diagonally-shaded area in FIG. 7 indicates a blackout state in which the display pixel row is not displayed.

In FIG. 7, an operation state of the image processing unit 17A of the digital signal processing unit 17 is illustrated in a line of "imaging processing".

A straight line R1 and a straight line R2 illustrated in FIG. 7 indicate timings at which resetting (processing of discharging charges accumulated in the photoelectric conversion unit) of each of the photoelectric conversion unit included in the pixel row 62 is performed.

A straight line f1a illustrated in FIG. 7 indicates a driving timing at which an imaging signal is read out from the pixel group f1 in the field F1. A straight line f2a illustrated in FIG. 7 indicates a driving timing at which an imaging signal is read out from the pixel group f2 in the field F2.

A straight line f3a illustrated in FIG. 7 indicates a driving timing at which an imaging signal is read out from the pixel group f3 in the field F3. A straight line f4a illustrated in FIG. 7 indicates a driving timing at which an imaging signal is read out from the pixel group f4 in the field F4. A straight line f5a illustrated in FIG. 7 indicates a driving timing at which an imaging signal is read out from the pixel group f5 in the field F5.

A straight line DR, a straight line DR1, and a straight line DR2 illustrated in FIG. 7 indicate timings at which drawing is performed in the display pixel row in the display surface of the display unit 23.

A straight line BO illustrated in FIG. 7 indicates a timing at which drawing of each display pixel row in the display unit 23 is stopped.

In a case where the digital camera 100 is set in the single shot mode, a live-view sequence LV is started. A period in which the live-view sequence LV is performed constitutes a not-storing period.

In the live-view sequence LV, the drive control unit 11A performs live-view drive control in which the drive control unit selects the pixel row 62 in the pixel group f1 in order from the upper end side of the light reception surface 60 toward the lower end side, as indicated by the straight line f1a, and reads an imaging signal from each pixel in the selected pixel row 62.

Then, the drive control unit 11A selects the pixel row 62 in order from the upper end side of the light reception surface 60 toward the lower end side, as indicated by the straight line R1, and resets the photoelectric conversion unit in the selected pixel row 62. Thus, exposing starts at a timing different for each pixel row 62.

In a case where predetermined exposure time has elapsed, the drive control unit 11A selects the pixel row 62 in the pixel group f1 in order from the upper end side of the light reception surface 60 toward the lower end side, as indicated by the straight line f1a, and reads an imaging signal from each pixel in the selected pixel row 62.

In a case where reading of the imaging signal from the pixel group f1 is started by the straight line f1a, and the imaging signal is output to the data bus 25, the digital signal processing unit 17 sequentially processes the imaging signal, and thus display image data is generated.

The display image data is transmitted to the display driver 22, and a live-view image based on the display image data is drawn line by line in order from the upper end side of the display surface, as indicated by the straight line DR.

The above-described processing repeats with synchronizing with the vertical synchronization signal VD, until an imaging instruction is received.

In a case where the imaging instruction is received in a period of the live-view sequence LV, a still-image exposing sequence EX is started at a falling timing (time point t1) of the vertical synchronization signal VD just after the imaging instruction.

In the still-image exposing sequence EX, the drive control unit 11A closes the mechanical shutter 3, and simultaneously resets the photoelectric conversion unit in all the pixel row 62 during a period in which the mechanical shutter 3 is closed, as indicated by the straight line R2. Then, the drive control unit 11A opens the mechanical shutter 3. Thus, exposure for still image capturing starts in all the pixel row 62 at the same timing.

The display control unit 17C stops drawing in the display unit 23 and controls the display unit 23 to be in the blackout (non-display) state, at a timing at which the mechanical shutter 3 is closed, as indicated by the straight line BO.

In a case where predetermined exposure time has elapsed from opening of the mechanical shutter 3, the drive control unit 11A closes the mechanical shutter 3 to end the exposure for still image capturing. Thus, the still-image exposing sequence EX ends. Then, a still-image reading sequence RE is started at a time point t2.

In the still-image reading sequence RE, firstly, the drive control unit 11A selects the pixel row 62 in the pixel group f1 in order from the upper end side of the light reception surface 60 toward the lower end side, as indicated by the straight line f1a, and reads an imaging signal from the selected pixel row 62.

In a case where reading of the imaging signal from the pixel group f1 is started at the time point t2, and the imaging signal is output to the data bus 25, the display-image data generation unit 17B sequentially processes the imaging signal and generates first display image data.

The display-image data generation unit 17B transmits the first display image data to the display driver 22. Thus, a postview image based on the first display image data is drawn line by line in order from the upper end side of the display surface, as indicated by the straight line DR1.

In a case where reading of the imaging signal from the pixel group f1 is completed at a time point t3, the drive control unit 11A selects the pixel row 62 in the pixel group f2 in order from the upper end side of the light reception surface 60 toward the lower end side, as indicated by the straight line f2a, and reads an imaging signal from the selected pixel row 62.

In a case where reading of the imaging signal from the pixel group f2 is started at the time point t3, and the imaging signal is output to the data bus 25, the display-image data generation unit 17B sequentially processes the imaging signal and generates second display image data.

The display-image data generation unit 17B transmits the second display image data to the display driver 22. Thus, a postview image based on the second display image data is drawn line by line in order from the upper end side of the display surface, as indicated by the straight line DR2.

In a case where reading of the imaging signal from the pixel group f2 is completed at a time point t4, the drive control unit 11A selects the pixel row 62 in the pixel group f3 in order from the upper end side of the light reception surface 60 toward the lower end side, as indicated by the straight line f3a, and reads an imaging signal from the selected pixel row 62. Here, the imaging signal which has been read is not used for generating the display image data, and the display of the display unit 23 is not updated.

In a case where reading of the imaging signal from the pixel group f3 is completed at a time point t5, the drive control unit 11A selects the pixel row 62 in the pixel group f4 in order from the upper end side of the light reception surface 60 toward the lower end side, as indicated by the straight line f4a, and reads an imaging signal from the selected pixel row 62. Here, the imaging signal which has been read is not used for generating the display image data, and the display of the display unit 23 is not updated.

In a case where reading of the imaging signal from the pixel group f4 is completed at a time point t6, the drive control unit 11A selects the pixel row 62 in the pixel group f5 in order from the upper end side of the light reception surface 60 toward the lower end side, as indicated by the straight line f5a, and reads an imaging signal from the selected pixel row 62. Here, the imaging signal which has been read is not used for generating the display image data, and the display of the display unit 23 is not updated.

In a case where reading of the imaging signal from the pixel group f5 is completed at a time point t7, the image processing unit 17A processes a still-image capturing signal group read by the operations indicated by the straight line f1a to f5a so as to generate captured image data. The image processing unit 17A stores the captured image data in the storage medium 21 ("captured image data generation" in FIG. 7). The live-view sequence LV is started again.

In FIG. 7, each of a period from the time point t2 to the time point t3, a period from the time point t3 to the time point t4, a period from the time point t4 to the time point t5, a period from the time point t5 to the time point t6, and a period from the time point t6 to the time point t7 constitutes the field period. A period in which the still-image exposing sequence EX and the subsequent still-image reading sequence RE are performed means a period in which the drive control unit 11A performs the drive control.

Figure 8:
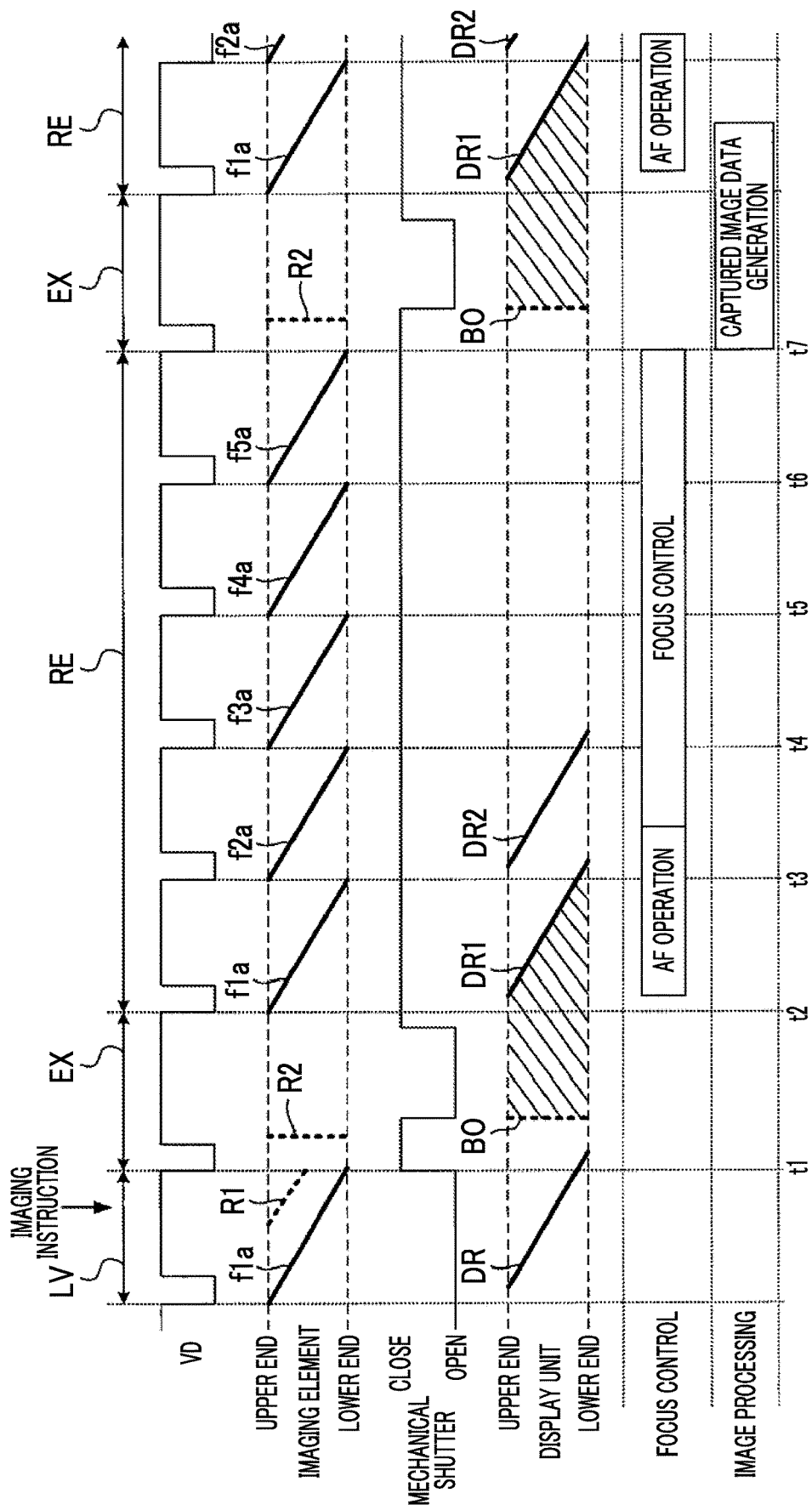
FIG. 8 is a timing chart illustrating an operation of the digital camera 100 illustrated in FIG. 1, in a continuous shooting mode.

FIG. 8 is a timing chart illustrating an operation of the digital camera 100 illustrated in FIG. 1, in the continuous shooting mode. In FIG. 8, an operation state of the focus control unit 11B is illustrated in a line of "focus control".

In a case where the digital camera 100 is set in the continuous shooting mode, the live-view sequence LV is started. The operation of the live-view sequence LV is as described with reference to FIG. 7, and thus descriptions thereof will not be repeated.

In a case where the imaging instruction is received in a period of the live-view sequence LV, a still-image exposing sequence EX is started at a falling timing (time point t1) of the vertical synchronization signal VD just after the imaging instruction. The operation of the still-image exposing sequence EX is as described with reference to FIG. 7, and thus descriptions thereof will not be repeated.

In a case where the still-image exposing sequence EX ends, the still-image reading sequence RE is started at a time point t2. A reading operation of the imaging signal from the imaging element 5 and a display operation in the display unit 23 in the still-image reading sequence RE are as described with reference to FIG. 7.

A difference between the still-image reading sequence RE in the continuous shooting mode and the still-image reading sequence RE in the single shot mode is an operation of the focus control unit 11B. Thus, this operation will be described.

In a case where reading of the imaging signal from the pixel group f1 is started at the time point t2, and the imaging signal is output to the data bus 25, the focus control unit 11B starts processing in which the focus control unit 11B calculates a phase difference with imaging signals read out from the phase-difference detection pixel 61R and the phase-difference detection pixel 61L among the imaging signals which have been read, and obtains a defocus quantity from the phase difference ("AF (Auto Focus) operation" in FIG. 8).

In a case where the focus control unit 11B completes the calculation of the defocus quantity in a period of reading the imaging signal from the pixel group f2, the focus control unit 11B controls the focal position of the focus lens based on the defocus quantity at any timing in a period to a time point t7 at which reading of the still-image capturing signal group from the imaging element 5 is completed ("focus control" in FIG. 8).

In a case where the still-image reading sequence RE ends at the time point t7, the still-image exposing sequence EX is performed. Then, the still-image reading sequence RE is performed. In the continuous shooting mode, the still-image exposing sequence EX and the still-image reading sequence RE are continuously reset plural times in accordance with the imaging instruction.

As described above, according to the digital camera 100 illustrated in FIG. 1, an imaging signal required for detecting a phase difference is included in the imaging signal group read out from the imaging element 5 in the first field period in the still-image reading sequence RE.

Therefore, in the continuous shooting mode, the focus control can be performed with the imaging signal in the period of the still-image reading sequence RE, and thus it is possible to realize focus control with high followability to a subject.

According to the digital camera 100 illustrated in FIG. 1, the imaging signal can be read from all the phase-difference detection pixels in the first field period in the still-image reading sequence RE. Therefore, it is possible to increase the volume of information used for detecting a phase difference and to improve focusing precision.

According to the digital camera 100 illustrated in FIG. 1, the postview image is displayed based on the imaging signal group read in the first field period in the still-image reading sequence RE, during the still-image reading sequence RE. Therefore, it is possible to perform postview display at a high speed.

The signal processing in which the imaging signal read out from the phase-difference detection pixel is treated as a signal read out from the imaging pixel is performed on the imaging signal group read out in the first field period in the still-image reading sequence RE. Therefore, it is possible to generate first display image data having a high resolution and to improve postview display quality.

Further, the postview image is switched to an image based on the second display image data generated without performing the signal processing based on the imaging signal read out from the imaging pixel. As described above, the postview image can be updated based on the display image data generated without performing the signal processing, and thus it is possible to improve the quality of a postview image.

According to the digital camera 100 illustrated in FIG. 1, the imaging signal is read from the pixel group f1 in the field F1 in the first field period in the still-image reading sequence RE, and the imaging signal is read from the pixel group f2 in the field F2 in the next field period.

Since the field F1 and the field F2 are adjacent to each other, it is possible to reduce a difference between a postview image based on the imaging signal group read out in the first field period and a postview image based on the imaging signal group read out in the next field period, to the minimum.

Accordingly, it is possible to switch a postview image by default, and to further improve the quality of the postview image.

According to the digital camera 100 illustrated in FIG. 1, in the continuous shooting mode, the display unit 23 is in the blackout state during a period from a start of exposing in each of a plurality of still-image exposing sequences EX to a start of displaying the postview image by the exposure. As described above, since the display unit 23 turns into blackout in each still-image exposing sequence EX, it is possible to give the user a feeling of continuous shooting.

According to the digital camera 100 illustrated in FIG. 1, in the live-view sequence LV, reading of the imaging signal from the imaging element 5 is performed at a ratio of one to five pixel rows 62. Similarly, in each field period, reading of the imaging signal from the imaging element 5 is performed at a ratio of one to five pixel rows 62.

Therefore, signal processing for live view display can be set to be identical to signal processing for post view, and it is possible to simplify processing.

Next, modification examples of the digital camera 100 illustrated in FIG. 1 will be described.

First Modification Example

Figure 9:
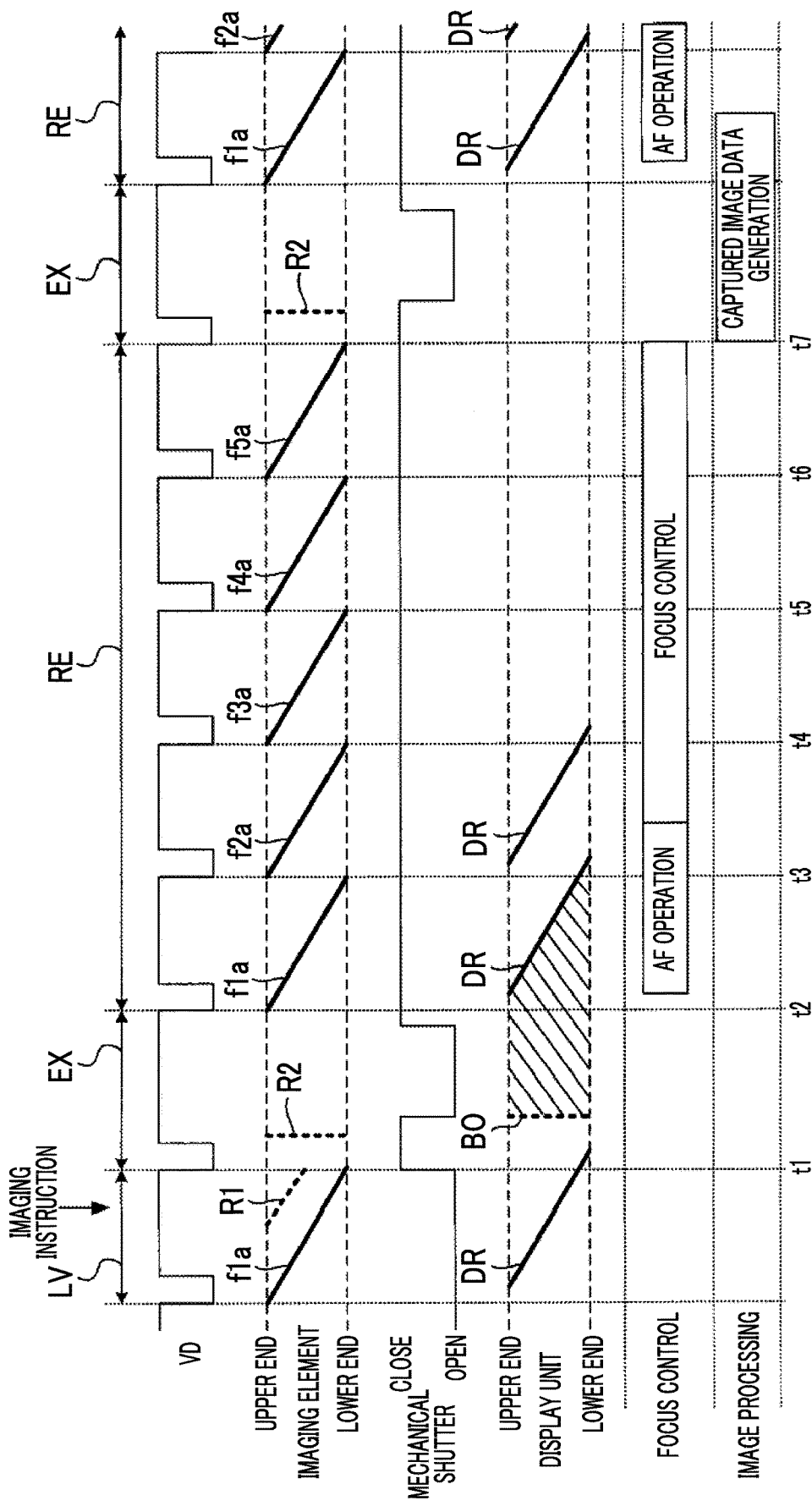
FIG. 9 is a timing chart illustrating a modification example of the operation of the digital camera 100 illustrated in FIG. 1, in the continuous shooting mode.

FIG. 9 is a timing chart illustrating a modification example of the operation of the digital camera 100 illustrated in FIG. 1, in the continuous shooting mode.

In the timing chart illustrated in FIG. 9, control of causing the display unit 23 to be in the blackout state, which is performed in each of the second and subsequent still-image exposing sequences EX in the timing chart illustrated in FIG. 8 is omitted.

As described above, in the continuous shooting mode, the display unit 23 is caused to be in the blackout state during a period from a start of the first exposure to a start of displaying a postview image, and the display unit 23 continuously displays the postview image during a period from a start of each of the second and subsequent exposures to the start of displaying a postview image. Thus, it is possible to eliminate blinking occurring by the display unit 23 repeating blackout. As a result, it is possible to improve display of a postview image.

The operation illustrated in FIG. 8 and the operation illustrated in FIG. 9 may be randomly switched by user settings. Thus, it is possible to perform processing in accordance with the preference of the user and to improve usability.

Second Modification Example

Among the fields F1 to F5 of the imaging element 5, the phase-difference detection pixel row PL in which a plurality of pairs P including the phase-difference detection pixels 61R and the phase-difference detection pixels 61L is provided may be included in the field (at least one field of the field F3 to the field F5) from which an imaging signal group is read out in the third and subsequent frame periods in the still-image reading sequence RE.

For example, a configuration in which the pixel arrangement of the pixel group in each of the field F1 and the field F3 is set to be as illustrated in FIG. 3, and the pixel arrangement of the pixel group in each of the field F2, the field F4, and the field F5 is set to be as illustrated in FIG. 4 is considered.

Figure 10:
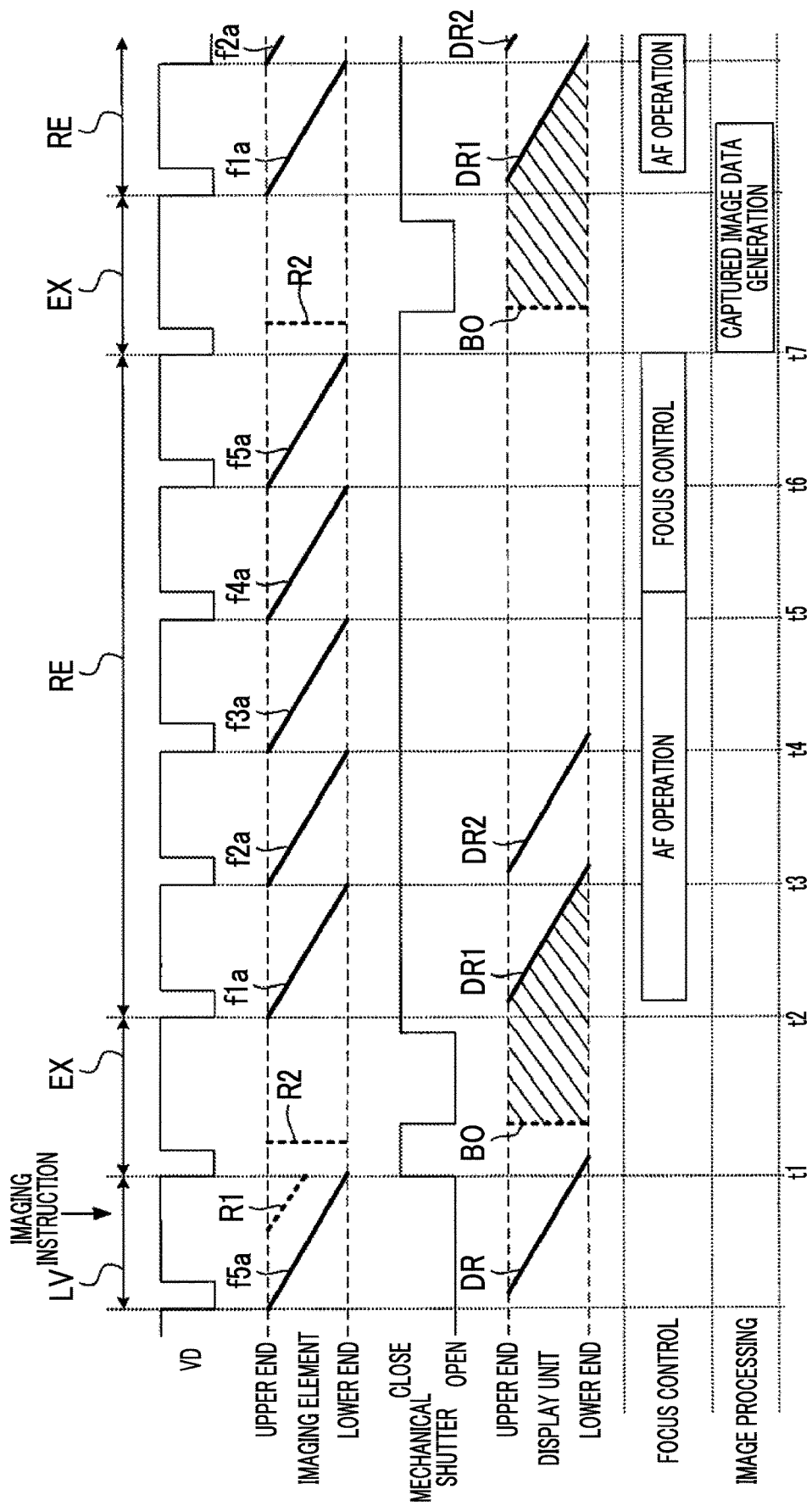
FIG. 10 is a timing chart illustrating another modification example of the operation of the digital camera 100 illustrated in FIG. 1, in the continuous shooting mode.

FIG. 10 is a timing chart illustrating the operation of the digital camera in the continuous shooting mode in the modification example. Only the operation of the focus control unit 11B in the timing chart illustrated in FIG. 10 is different from that in FIG. 8.

In the modification example, the focus control unit 11B calculates the defocus quantity based on the imaging signal read out from the phase-difference detection pixel of the pixel group f1 by the straight line f1a and the imaging signal read out from the phase-difference detection pixel of the pixel group f3 by the straight line f3a. Then, the focus control unit 11B controls the focal position of the focus lens based on the defocus quantity, during a period to a time point t7.

According to the modification example, it is possible to increase the number of imaging signals used for calculating the phase difference. Thus, it is possible to improve calculation accuracy of the phase difference and to perform focus control with high precision. It is possible to increase the number of pairs P provided in the light reception surface 60, and to flexibly set a range of a subject allowed to be focused on.

Third Modification Example

The imaging element 5 has a configuration in which pixels 61 are arranged in the light reception surface 60 in accordance with the Bayer pattern. However, the pixels 61 may be arranged in the light reception surface 60 in accordance with a specific pattern illustrated in FIG. 11 other than the Bayer pattern.

Figure 11:
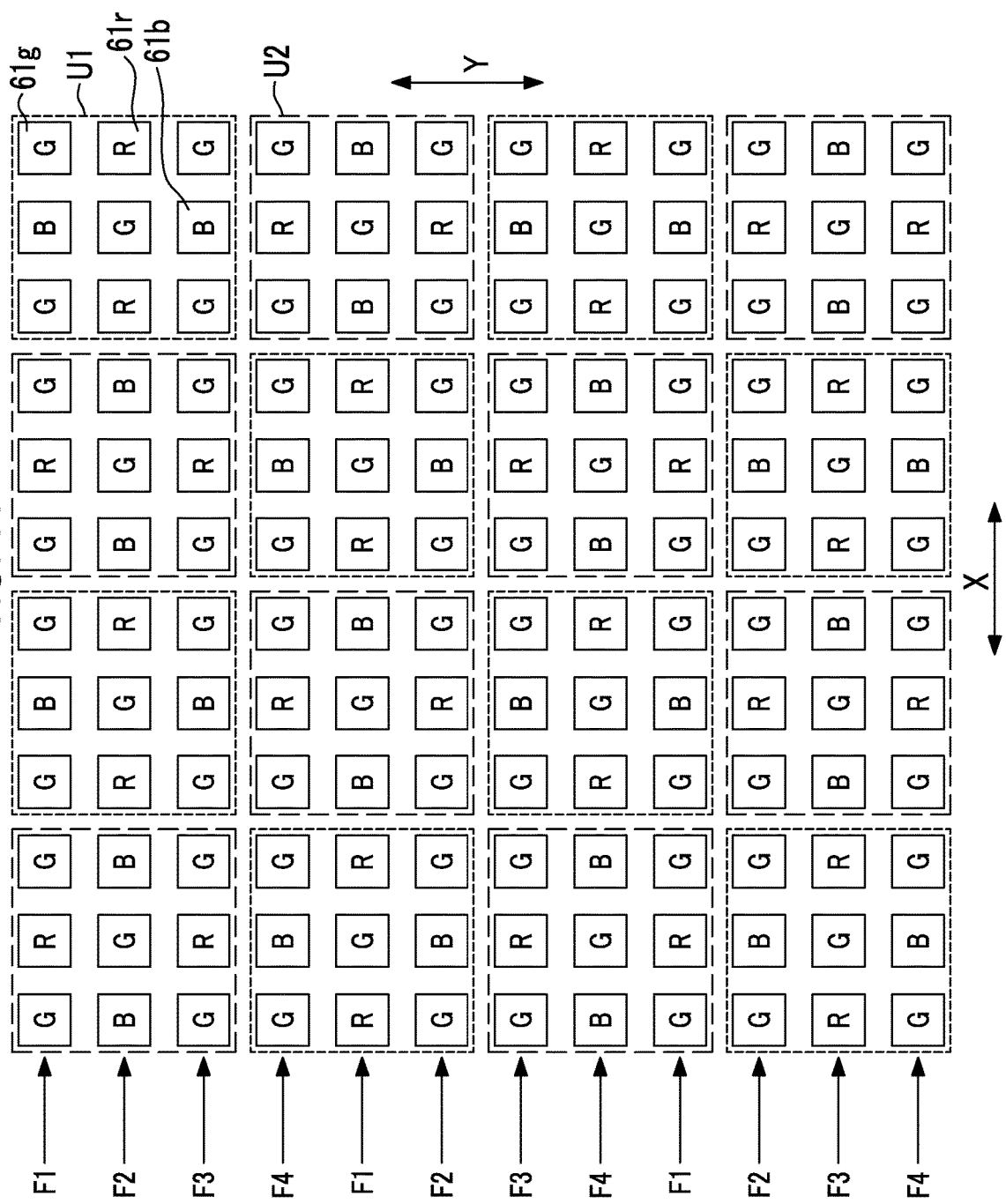
FIG. 11 is a diagram illustrating a modification example of arrangement of pixels disposed on a light reception surface 60 of the imaging element 5.

FIG. 11 is a diagram illustrating a modification example of arrangement of pixels disposed on the light reception surface 60 of the imaging element 5.

The pixels of the imaging element 5 illustrated in FIG. 11 are arranged in accordance with an arrangement pattern in which a ratio between the number of pixels in which red light is photoelectrically converted, the number of pixels in which blue light is photoelectrically converted, and the number of pixels in which green light is photoelectrically converted is 1:1:2.5.

The arrangement pattern is a pattern including a unit U1 and a unit U2. In the pattern, the unit U1 and the unit U2 are arranged in the row direction X and the column direction Y to be checkered. In the unit U1, a first row, a second row, and the first row are arranged in the column direction. In the first row, an imaging pixel 61g, an imaging pixel 61b, and an imaging pixel 61g are arranged in the row direction X. In the second row, an imaging pixel 61r, an imaging pixel 61g, and an imaging pixel 61r are arranged in the row direction X. In the unit U2, a third row, a fourth row, and the third row are arranged in the column direction. In the third row, an imaging pixel 61g, an imaging pixel 61r, and an imaging pixel 61g are arranged in the row direction X. In the fourth row, an imaging pixel 61b, an imaging pixel 61g, and an imaging pixel 61b are arranged in the row direction X.

The photoelectric conversion unit included in the imaging pixel 61g constitutes a fourth photoelectric conversion unit. The photoelectric conversion unit included in the imaging pixel 61b constitutes a fifth photoelectric conversion unit. The photoelectric conversion unit included in the imaging pixel 61r constitutes a sixth photoelectric conversion unit.

The digital signal processing unit 17 of a digital camera in which the imaging element 5 illustrated in FIG. 11 is mounted performs demosaic processing on the still-image capturing signal group which is a set of imaging signals read out from all the pixels included in the imaging element 5. Thus, the digital signal processing unit 17 generates a red signal, a green signal, and a blue signal with corresponding to the position of each pixel in the imaging element 5 and generates a brightness signal corresponding to the position of each pixel, by weighting and adding the red signal, the green signal, and the blue signal.

For example, the digital signal processing unit 17 obtains the brightness signal by weighting and adding the red signal, the green signal, and the blue signal at a ratio of 3:6:1.

The digital signal processing unit 17 generates a color difference signal with the brightness signal, the red signal, the green signal, and the blue signal. With such processing, a pixel signal including the brightness signal and the color difference signal is generated with corresponding to the position of each pixel in the imaging element 5. A set of pixel signals constitutes captured image data.

Thus, in the imaging element 5 in the pixel arrangement illustrated in FIG. 11, among the imaging pixel 60r, the imaging pixel 60g, and the imaging pixel 60b, the imaging pixel 60g acts as a pixel that receives light of the green color as the first color which contributes most to obtaining of the brightness signal. The imaging pixel 60b acts as a pixel that receives light of the second color different from the first color. The imaging pixel 60r acts as a pixel that receives light of the third color different from the first color and the second color.

Four fields F1 to F4 are set in the light reception surface 60 of the imaging element 5 illustrated in FIG. 11. In the modification example, the number of fields set in the light reception surface 60 is an even number of 2 or more.

In the imaging element 5 illustrated in FIG. 11, in a case where M is set to an integer of 0 or more, the number of fields set in the light reception surface 60 is set as n (here, n=4), k is set to 1 to n, a region in which the (n×M+k)th pixel row 62 from the upper end side of the light reception surface 60 among all the pixel rows 62 arranged on the light reception surface 60 is disposed is set to be a field Fk.

Among the field F1 to the field F4, some of pixel rows constituting the pixel group in the field F1 function as the phase-difference detection pixel rows PL.

Figure 12:
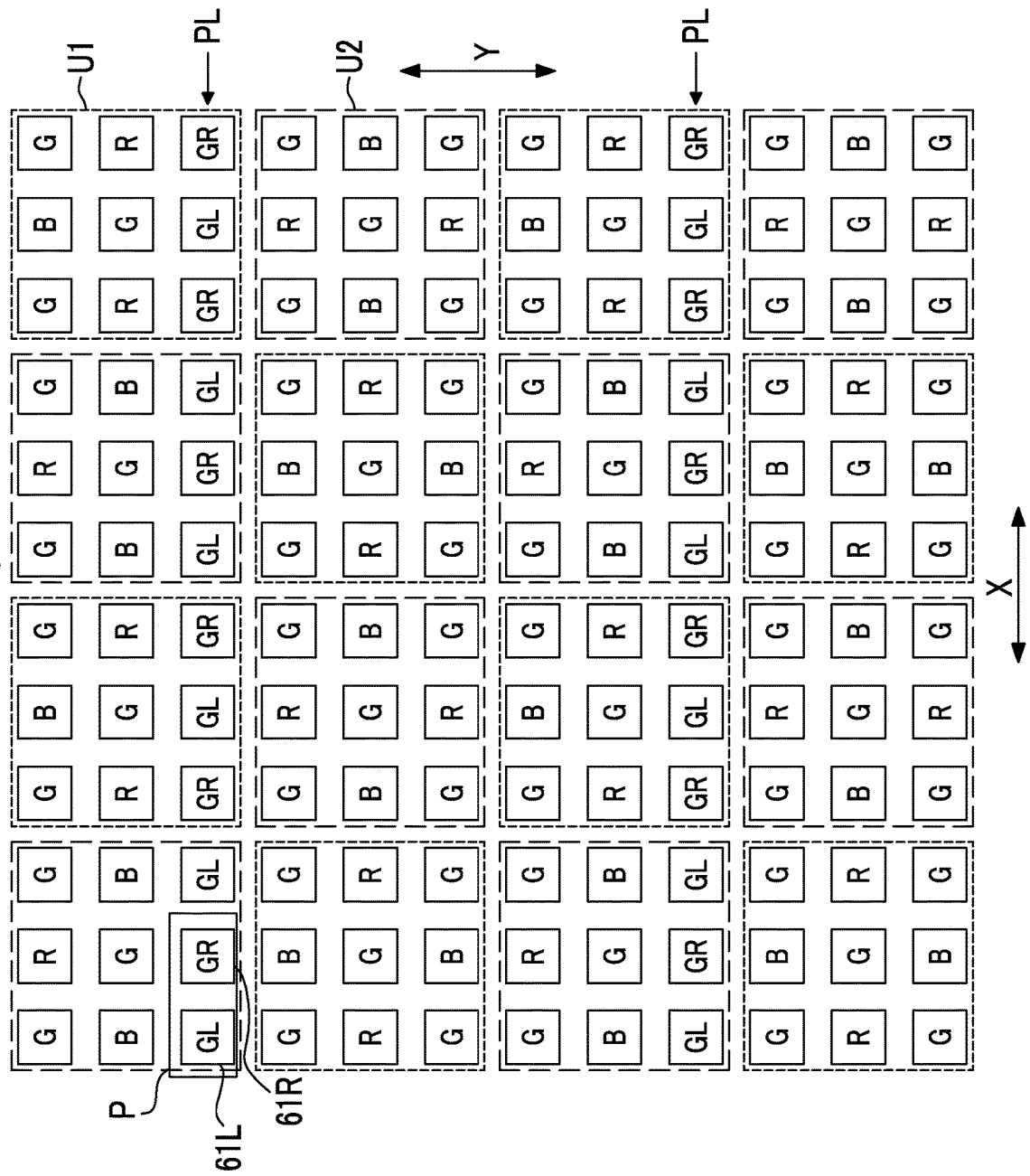
FIG. 12 is a diagram partially illustrating pixel arrangement of a pixel group in a field F1 of the imaging element 5 illustrated in FIG. 11.

FIG. 12 is a diagram partially illustrating pixel arrangement of the pixel group in the field F1 of the imaging element 5 illustrated in FIG. 11.

As illustrated in FIG. 12, some of pixel rows constituting the pixel group in the field F1 function as the phase-difference detection pixel rows PL, and five pixel rows including only imaging pixels are disposed between the phase-difference detection pixel rows PL, in the example in FIG. 12.

In order to generate the first display image data having high quality by the imaging signal group read out from the pixel group illustrated in FIG. 12 by the signal processing performed by the display-image data generation unit 17B, it is necessary that a condition that at least one pixel row constituted by only imaging pixels is provided between two phase-difference detection pixel rows PL adjacent to each other in the column direction Y in the pixel arrangement illustrated in FIG. 12 is satisfied.

In order to satisfy the condition, in a case where m is set as a natural number of 2 or more, phase-difference detection pixel rows PL of which the number is {(n×m)−1} are arranged in the light reception surface 60.

In the digital camera in which the imaging element 5 illustrated in FIG. 11 is mounted, n is 4, m is 6, and 24 phase-difference detection pixel rows PL are arranged in the light reception surface 60. That is, 24 pixel rows 62 including only imaging pixels are provided between two phase-difference detection pixel rows PL which are disposed in the light reception surface 60 to be closest to each other.

As described above, it is possible to obtain the same effects as those in the above-described digital camera 100 illustrated in FIG. 1, even though the imaging element 5 having pixel arrangement illustrated in FIG. 11 is used.

A configuration of a smartphone as the imaging device will be described below.

Figure 13:
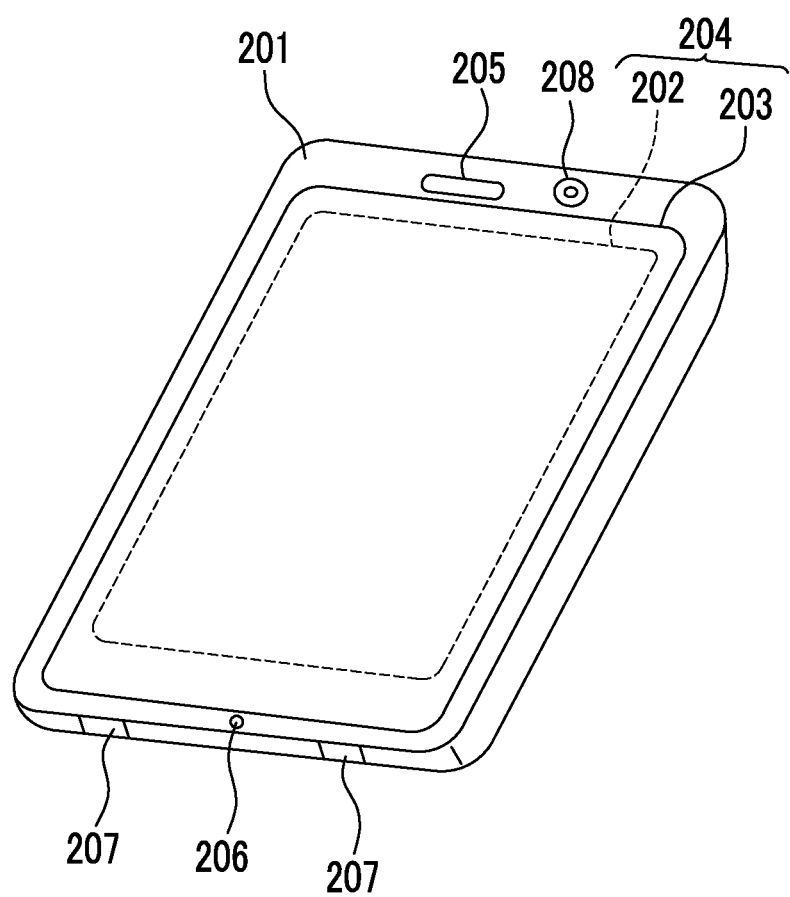
FIG. 13 illustrates an appearance of a smartphone 200 as an embodiment of the imaging device according to the present invention.

FIG. 13 illustrates an appearance of a smartphone 200 as an embodiment of the imaging device according to the present invention.

The smartphone 200 illustrated in FIG. 13 has a flat casing 201 and comprises a display input unit 204 in which a display panel 202 as a display unit and an operation panel 203 as an input unit are integrally formed on one surface of the casing 201.

Further, such a casing 201 comprises a speaker 205, a microphone 206, an operation unit 207, and a camera unit 208.

A configuration of the casing 201 is not limited thereto. For example, a configuration in which the display unit and the input unit are independent can be adopted, or a configuration having a folding structure or a sliding mechanism can be adopted.

Figure 14:
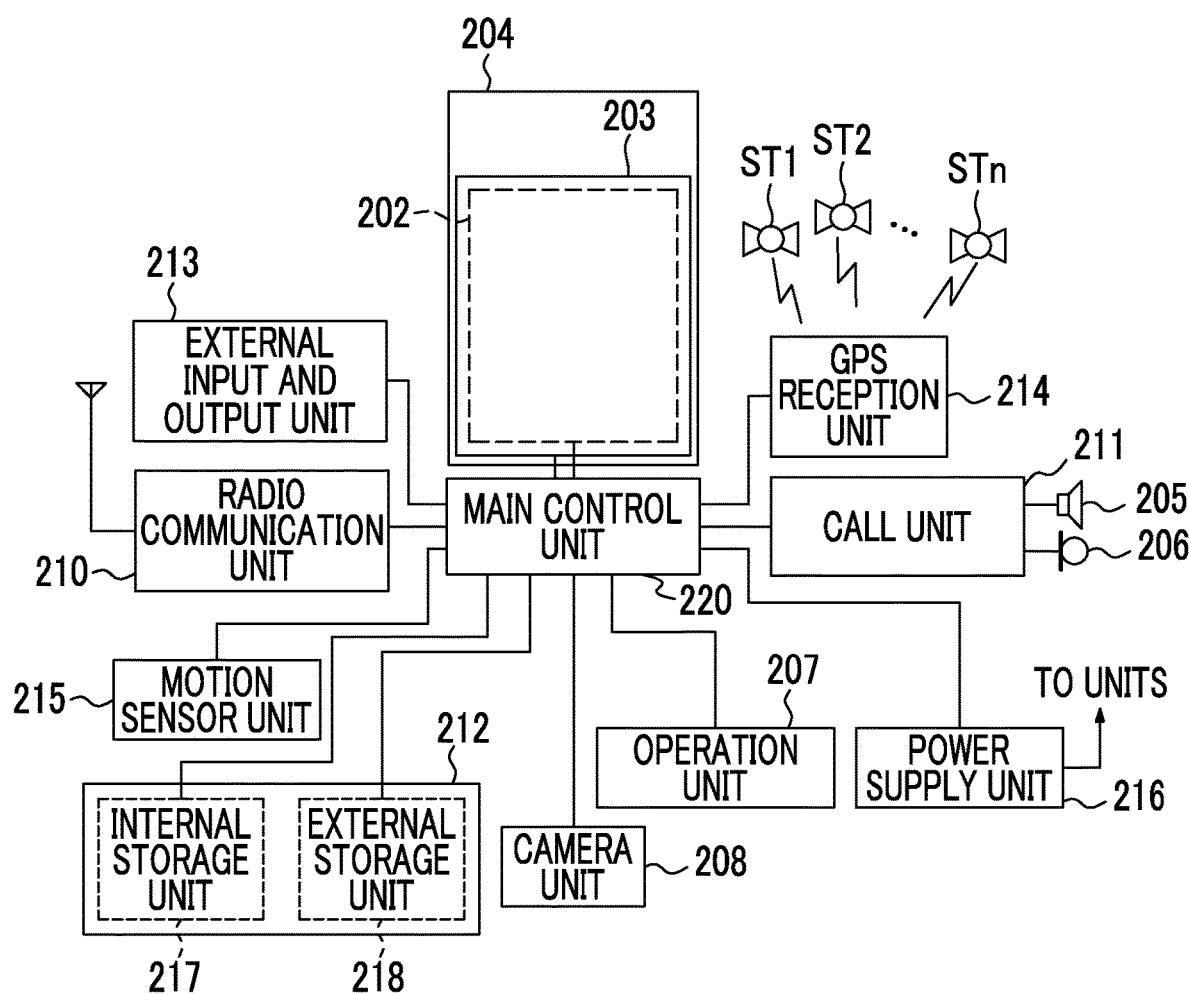
FIG. 14 is a block diagram illustrating a configuration of the smartphone 200 illustrated in FIG. 13.

FIG. 14 is a block diagram illustrating a configuration of the smartphone 200 illustrated in FIG. 13.

As illustrated in FIG. 14, the smartphone comprises a radio communication unit 210, a display input unit 204, a call unit 211, an operation unit 207, a camera unit 208, a storage unit 212, an external input and output unit 213, a global positioning system (GPS) reception unit 214, a motion sensor unit 215, a power supply unit 216, and a main control unit 220, as the main components.

In addition, the smartphone 200 includes, as a main function, a radio communication function of performing mobile radio communication via a base station device BS (not shown) and a mobile communication network NW (not shown).

The radio communication unit 210 performs radio communication with the base station device BS accommodated in the mobile communication network NW according to an instruction from the main control unit 220. The radio communication unit 210 performs transmission and reception of various types of file data such as audio data and image data, e-mail data, or the like, or reception of web data, streaming data, or the like, using the radio communication.

The display input unit 204 is a so-called touch panel that displays an image (still image or moving image), text information, or the like to visually transfer information to the user, and detects a user operation with respect to the displayed information under the control of the main control unit 220, and comprises a display panel 202 and an operation panel 203.

For the display panel 202, a liquid crystal display (LCD), an organic electro-luminescence display (OELD), or the like is used as a display device.

The operation panel 203 is a device that is placed so that an image displayed on the display surface of the display panel 202 can be visually recognized, and detects one or a plurality of coordinates, which is operated by a finger of a user or a stylus. In a case in which this device is operated by the finger of the user or the stylus, a detection signal generated due to the operation is output to the main control unit 220. Then, the main control unit 220 detects an operation position (coordinates) on the display panel 202 on the basis of the received detection signal.

As illustrated in FIG. 13, the display panel 202 and the operation panel 203 of the smartphone 200 illustrated as an embodiment of the imaging device in the present invention are integrated to constitute the display input unit 204, but the operation panel 203 is disposed to completely cover the display panel 202.

In a case in which such a disposition has been adopted, the operation panel 203 may also have a function of detecting a user operation in an area outside the display panel 202. In other words, the operation panel 203 may include a detection area (hereinafter referred to as a display area) for an overlapping portion overlapping the display panel 202, and a detection area (hereinafter referred to as a non-display area) for an outer edge portion not overlapping the display panel 202 other than the display area.

It should be noted that although a size of the display area may perfectly match a size of the display panel 202, it is not always necessary to match the size of the display area with the size of the display panel 202. In addition, the operation panel 203 may include two sensitive areas including an outer edge portion and an inner portion other than the outer edge portion.

Further, a width of the outer edge portion is appropriately designed according to a size of the casing 201, or the like. Furthermore, examples of a position detection scheme adopted in the operation panel 203 may include a matrix switching scheme, a resistive film scheme, a surface acoustic wave scheme, an infrared scheme, an electromagnetic induction scheme, and a capacitive scheme, and any one of the schemes can also be adopted.

The call unit 211 comprises a speaker 205 or a microphone 206, converts a voice of the user input through the microphone 206 into audio data that can be processed by the main control unit 220, and outputs the audio data to the main control unit 220 or decodes audio signal received by the radio communication unit 210 or the external input and output unit 213 and outputs the decoded audio data from the speaker 205.

Further, as illustrated in FIG. 13, for example, the speaker 205 can be mounted on the same surface as a surface on which the display input unit 204 is provided, and the microphone 206 can be mounted on a side surface of the casing 201.

The operation unit 207 is a hardware key using a key switch or the like, and receives an instruction from the user. For example, as illustrated in FIG. 13, the operation unit 207 is a push button type switch that is mounted on the side face of the casing 201 of the smartphone 200, is turned on in a case in which the operation unit 207 is pressed by a finger or the like, and is turned off by a restoring force of a spring or the like in a case in which the finger is released.

The storage unit 212 stores a control program or control data of the main control unit 220, application software, address data associating a name, a telephone number, or the like of a communication partner, transmitted or received data of an e-mail, web data downloaded by web browsing, and downloaded content data, and temporarily stores streaming data or the like.

Further, the storage unit 212 includes an internal storage unit 217 built in the smartphone and an external storage unit 218 having a slot for detachable external memory. The internal storage unit 217 and the external storage unit 218 constituting the storage unit 212 are realized by a storage medium such as a flash memory type, hard disk type, multimedia card micro type, or card type of memory (for example, a MicroSD (registered trademark) memory), a random access memory (RAM), or a read only memory (ROM).

The external input and output unit 213 serves as an interface with all external devices connected to the smartphone 200, and is a unit for direct or indirect connection to other external devices through communication (for example, universal serial bus (USB) or IEEE 1394) or a network (for example, the Internet, a wireless LAN, Bluetooth (registered trademark), radio frequency identification (RFID), infrared communication (infrared data association: IrDA) (registered trademark), ultra wide band (UWB) (registered trademark), or ZigBee (registered trademark)).

Examples of the external devices connected to the smartphone 200 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, an external audio and video device that is connected wirelessly, a smartphone connected by a cable/wirelessly, a personal computer connected by a cable/wirelessly, a PDA connected by a cable/wirelessly, and an earphone connected by a cable/wirelessly. The external input and output unit 213 is capable of transferring data transmitted from such an external device to internal components of the smartphone 200 or transmitting data in the smartphone 200 to the external device.

According to an instruction from the main control unit 220, the GPS reception unit 214 receives GPS signals transmitted from GPS satellites ST1 to STn, and executes a positioning calculation process based on the plurality of received GPS signals to calculate a position represented by a latitude, longitude, and altitude of the smartphone 200. In a case in which position information can be acquired from the radio communication unit 210 or the external input and output unit 213 (for example, a wireless LAN), the GPS reception unit 214 can also detect the position using the position information.

The motion sensor unit 215 comprises, for example, a triaxial acceleration sensor or the like, and detects a physical movement of the smartphone 200 according to an instruction from the main control unit 220. By detecting the physical movement of the smartphone 200, a moving direction or an acceleration of the smartphone 200 is detected. A result of the detection is output to the main control unit 220.

The power supply unit 216 supplies power accumulated in a battery (not illustrated) to each unit of the smartphone 200 according to an instruction from the main control unit 220.

The main control unit 220 comprises a microprocessor, operates according to a control program or control data stored in the storage unit 212, and totally controls each unit of the smartphone 200. In addition, the main control unit 220 includes a mobile communication control function of controlling each unit of the communication system and an application processing function in order to perform audio communication or data communication through the radio communication unit 210.

The application processing function is realized by the main control unit 220 operating according to the application software stored in the storage unit 212. Examples of the application processing function include an infrared communication function of controlling the external input and output unit 213 to perform data communication with an opposite device, an e-mail function of transmitting and receiving an e-mail, and a web browsing function of browsing a web page.

Further, the main control unit 220 includes an image processing function such as displaying an image on the display input unit 204 on the basis of image data (data of a still image or moving image) such as received data or downloaded streaming data. The image processing function is a function of the main control unit 220 decoding the image data, applying image processing to a result of the decoding, and displaying the image on the display input unit 204.

Further, the main control unit 220 executes display control for the display panel 202 and operation detection control for detecting a user operation through the operation unit 207 and the operation panel 203. Through the execution of the display control, the main control unit 220 displays a window for displaying a software key such as an icon or a scroll bar for activating application software or creating an e-mail.

Regarding, for example, a large image which does not fit to a display area of the display panel 202, the scroll bar refers to a software key for receiving an instruction to move a display unit of an image.

Further, through execution of the operation detection control, the main control unit 220 detects a user operation through the operation unit 207, receives an operation with respect to the icon or an input of a character string to an input field of the window through the operation panel 203, or receives a scroll request of a display image through the scroll bar.

Furthermore, through the execution of the operation detection control, the main control unit 220 includes a touch panel control function of determining whether a position of an operation with respect to the operation panel 203 is in the overlapping portion (the display area) overlapping the display panel 202 or in the outer edge portion (the non-display area) not overlapping the display panel 202, other than the display area, and controlling a sensitive area of the operation panel 203 or a display position of the software key.

Further, the main control unit 220 can detect a gesture operation with respect to the operation panel 203 and execute a preset function according to the detected gesture operation. The gesture operation is not a simple touch operation in the related art, but is an operation for drawing a trajectory with respect to at least one of a plurality of positions by drawing a trajectory with a finger or the like, by designating a plurality of positions simultaneously, or in a combination thereof.

The camera unit 208 includes configurations other than the external memory control unit 20, the storage medium 21, the display unit 23, the display driver 22, and the operation unit 14 in the digital camera illustrated in FIG. 1. The captured image data generated by the camera unit 208 can be stored in the storage unit 212 or output via the external input and output unit 213 or the radio communication unit 210.

In the smartphone 200 illustrated in FIG. 13, the camera unit 208 is mounted on the same surface as the display input unit 204, but a mounting position of the camera unit 208 is not limited thereto and may be mounted on a back surface of the display input unit 204.

In addition, the camera unit 208 can be used for various functions of the smartphone 200. For example, an image acquired by the camera unit 208 can be displayed in the display panel 202, or an image of the camera unit 208 can be used as one of operation inputs of the operation panel 203.

Further, in a case in which the GPS reception unit 214 detects the position, the GPS reception unit 214 can detect the position by referring to the image from the camera unit 208. Further, by referring to the image from the camera unit 208, it is possible to determine an optical axis direction of the camera unit 208 of the smartphone 200 without using a triaxial acceleration sensor or in combination with the triaxial acceleration sensor or determine a current use environment. It is obvious that the image from the camera unit 208 can be used in application software.

In addition, the position information acquired by the GPS reception unit 214, the audio information acquired by the microphone 206 (which may be text information obtained through audio-text conversion in the main control unit or the like), the posture information acquired by the motion sensor unit 215, or the like may be added to the image data of the still image or the moving image and stored in the storage unit 212 or output via the external input and output unit 213 or the radio communication unit 210.

Even in the smartphone 200 having the above-described configuration, it is possible to display a postview image having high quality at a high speed and to perform high-speed focus control in the continuous shooting mode, by the operations illustrated in FIGS. 7 to 10.

In the embodiment and the modification examples, a case where the phase difference is detected in the row direction X is described as an example. However, the present invention can also be applied to a case where the phase difference is detected in the column direction Y.

In the embodiment and the modification examples, the MOS type is used as the imaging element 5. However, it is possible to obtain the similar effects even though a CCD type imaging element is used.

As the imaging element 5, an imaging element in which each pixel includes a charge holding unit that holds charges accumulated in the photoelectric conversion unit, and an imaging signal is read out by transferring charges held in the charge holding unit, in a manner of floating diffusion can be used. In a case using an imaging element of such a type, the mechanical shutter 3 is not required.

As described above, the followings are disclosed in the present specification.

(1) An imaging device comprising an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens, a drive control unit that performs, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an image processing unit that processes the imaging signal group read out from the imaging element so as to generate captured image data and stores the captured image data in a storage medium, a display-image data generation unit that processes a first imaging signal group read out from the imaging element in a first field period among the plurality of field periods, so as to generate first display image data and processes a second imaging signal group read out from the imaging element in a field period next to the first field period, so as to generate second display image data, and a display control unit that displays a first image based on the first display image data in the display unit and then changes the first image to a second image based on the second display image data. The drive control unit reads out imaging signals from a plurality of pairs including the first photoelectric conversion units and the second photoelectric conversion units and a plurality of the third photoelectric conversion units in the first field period and reads out imaging signals from a plurality of the third photoelectric conversion units in the next field period.

(2) In the imaging device in (1), the display-image data generation unit performs signal processing on the first imaging signal group and generates the first display image data based on the first imaging signal group subjected to the signal processing, the signal processing being performed so that each of a first imaging signal read out from the first photoelectric conversion unit and a second imaging signal read out from the second photoelectric conversion unit in the first imaging signal group is treated as being read out from the third photoelectric conversion unit.

(3) In the imaging device in (2), the signal processing is processing in which the first imaging signal is replaced with an imaging signal read out from the third photoelectric conversion unit around the first photoelectric conversion unit as a source for reading out the first imaging signal or with an imaging signal generated based on the imaging signal, and the second imaging signal is replaced with an imaging signal read out from the third photoelectric conversion unit around the second photoelectric conversion unit as a source for reading out the second imaging signal or with an imaging signal generated based on the imaging signal.

(4) In the imaging device in (2), the signal processing is processing in which the first imaging signal is multiplied by a gain, and the second imaging signal is multiplied by a gain.

(5) In the imaging device in any one of (1) to (4), the drive control unit reads out imaging signals from all pairs of the first photoelectric conversion units and the second photoelectric conversion units and a plurality of the third photoelectric conversion units in the first field period.

(6) In the imaging device in any one of (1) to (4), the drive control unit reads out the imaging signal group in three or more field periods, reads out imaging signals from some of all pairs of the first photoelectric conversion units and the second photoelectric conversion units and a plurality of the third photoelectric conversion units in a first field period of the three or more field periods, reads out imaging signals from a plurality of the third photoelectric conversion units in a second field period of the three or more field periods, and reads out imaging signals from the remaining pairs of all the pairs and the remaining third photoelectric conversion units in a third field period and the subsequent of the three or more field periods.

(7) The imaging device in any one of (1) to (6) further comprises a focus control unit that performs a focus control of the imaging optical system by controlling the focus lens based on a first imaging signal read out from the first photoelectric conversion unit and a second imaging signal read out from the second photoelectric conversion unit in the first imaging signal group before reading of the imaging signal group from the imaging element is completed.

(8) In the imaging device in any one of (1) to (7), a continuous shooting mode in which the drive control is consecutively performed plural times in accordance with the imaging instruction is provided, and the display control unit causes blackout to occur in the display unit during a period from a start of the exposure by each of the drive controls of the plural times to a start of displaying the first image, in the continuous shooting mode.

(9) In the imaging device in any one of (1) to (7), a continuous shooting mode in which the drive control is consecutively performed plural times in accordance with the imaging instruction is provided, and the display control unit causes blackout to occur in the display unit during a period from a start of the exposure by a first drive control among the drive controls of the plural times to a start of displaying the first image, and continuously displays the second image in the display unit during a period from a start of the exposure by second and the subsequent drive controls among the drive controls of the plural times to a start of displaying the first image, in the continuous shooting mode.

(10) In the imaging device in any one of (1) to (9), the drive control unit reads out the imaging signal from the photoelectric conversion unit included in a plurality of the pixel rows in each of the plurality of field periods, and the pixel row in which the imaging signal is read out from the imaging element in the first field period is adjacent to the pixel row in which the imaging signal is read out from the imaging element in the next field period.

(11) In the imaging device in any one of (1) to (10), the drive control unit performs a live-view drive control of exposing the photoelectric conversion unit group and reading out an imaging signal which has been photoelectrically converted by 1/N of all the photoelectric conversion units included in the photoelectric conversion unit group during the exposure, from the imaging element, in a not-storing period other than the period in which the drive control is performed, wherein N is a natural number, and the number of the plurality of field periods in the drive control performed in accordance with the imaging instruction is equal to N.

(12) In the imaging device in any one of (1) to (11), all the photoelectric conversion units included in the imaging element are arranged in accordance with a Bayer pattern, and the number of the plurality of field periods in the drive control performed in accordance with the imaging instruction is an odd number of 3 or more.

(13) In the imaging device in (12), the plurality of pixel rows includes a pixel row including a pair of the first photoelectric conversion unit and the second photoelectric conversion unit and a pixel row including only the third photoelectric conversion unit. In a case where the number of the plurality of field periods is set as n, and m is set as a natural number of 2 or more, the pixel row including the pair is disposed at every {(n×m)−1} rows.

(14) In the imaging device in any one of (1) to (11), all the photoelectric conversion units included in the imaging element are arranged in accordance with a specific pattern. In the specific pattern, a first unit and a second unit are arranged in the one direction and a direction perpendicular to the one direction to be checkered. Each of the first unit and the second unit includes five fourth photoelectric conversion units that receive light of a first color which contributes most to a brightness component, two fifth photoelectric conversion units that receive light of a second color different from the first color, and two sixth photoelectric conversion units that receive light of a third color different from the first color and the second color. The first unit has a configuration in which a first row, a second row, and the first row are arranged in the direction perpendicular to the one direction. In the first row, the fourth photoelectric conversion unit, the fifth photoelectric conversion unit, and the fourth photoelectric conversion unit are arranged in the one direction. In the second row, the sixth photoelectric conversion unit, the fourth photoelectric conversion unit, and the sixth photoelectric conversion unit are arranged in the one direction. The second unit has a configuration in which a third row, a fourth row, and the third row are arranged in the direction perpendicular to the one direction. In the third row, the fourth photoelectric conversion unit, the sixth photoelectric conversion unit, and the fourth photoelectric conversion unit are arranged in the one direction. In the fourth row, the fifth photoelectric conversion unit, the fourth photoelectric conversion unit, and the fifth photoelectric conversion unit are arranged in the one direction. The number of the plurality of field periods in the drive control performed in accordance with the imaging instruction is an even number.

(15) In the imaging device in (14), the plurality of pixel rows includes a pixel row including a pair of the first photoelectric conversion unit and the second photoelectric conversion unit and a pixel row including only the third photoelectric conversion unit. In a case where the number of the plurality of field periods is set as n, and m is set as a natural number of 2 or more, the pixel row including the pair is disposed at every {(n×m)−1} rows.

(16) There is provided an imaging method of imaging a subject with an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens. The method comprises a drive control step of performing, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an imaging processing step of processing the imaging signal group read out from the imaging element so as to generate captured image data and storing the captured image data in a storage medium, a display-image data generation step of processing a first imaging signal group read out from the imaging element in a first field period among the plurality of field periods, so as to generate first display image data and processing a second imaging signal group read out from the imaging element in a field period next to the first field period, so as to generate second display image data, and a display control step of displaying a first image based on the first display image data in the display unit and then changing the first image to a second image based on the second display image data. In the drive control step, imaging signals are read out from a plurality of pairs including the first photoelectric conversion units and the second photoelectric conversion units and a plurality of the third photoelectric conversion units in the first field period, and imaging signals are read out from a plurality of the third photoelectric conversion units in the next field period.

(17) In the imaging method in (16), in the display-image data generation step, signal processing is performed on the first imaging signal group, and the first display image data is generated based on the first imaging signal group subjected to the signal processing, the signal processing being performed so that each of a first imaging signal read out from the first photoelectric conversion unit and a second imaging signal read out from the second photoelectric conversion unit in the first imaging signal group is treated as being read out from the third photoelectric conversion unit.

(18) In the imaging method in (17), the signal processing is processing in which the first imaging signal is replaced with an imaging signal read out from the third photoelectric conversion unit around the first photoelectric conversion unit as a source for reading out the first imaging signal or with an imaging signal generated based on the imaging signal, and the second imaging signal is replaced with an imaging signal read out from the third photoelectric conversion unit around the second photoelectric conversion unit as a source for reading out the second imaging signal or with an imaging signal generated based on the imaging signal.

(19) In the imaging method in (17), the signal processing is processing in which the first imaging signal is multiplied by a gain, and the second imaging signal is multiplied by a gain.

(20) In the imaging method in any one of (16) to (19), in the drive control step, imaging signals are read out from all pairs of the first photoelectric conversion units and the second photoelectric conversion units and a plurality of the third photoelectric conversion units in the first field period.

(21) In the imaging method in any one of (16) to (19), in the drive control step, the imaging signal group is read out in three or more field periods, imaging signals are read out from some of all pairs of the first photoelectric conversion units and the second photoelectric conversion units and a plurality of the third photoelectric conversion units in a first field period of the three or more field periods, imaging signals are read out from a plurality of the third photoelectric conversion units in a second field period of the three or more field periods, and imaging signals are read out from the remaining pairs of all the pairs and the remaining third photoelectric conversion units in a third field period and the subsequent of the three or more field periods.

(22) The imaging method in any one of (16) to (21) further comprises a focus control step of performing a focus control of the imaging optical system by controlling the focus lens based on a first imaging signal read out from the first photoelectric conversion unit and a second imaging signal read out from the second photoelectric conversion unit in the first imaging signal group before reading of the imaging signal group from the imaging element is completed.

(23) In the imaging method in any one of (16) to (22), in the display control step, in a continuous shooting mode in which the drive control is consecutively performed plural times in accordance with the imaging instruction, blackout is caused to occur in the display unit during a period from a start of the exposure by each of the drive controls of the plural times to a start of displaying the first image.

(24) In the imaging method in any one of (16) to (22), in the display control step, in a continuous shooting mode in which the drive control is consecutively performed plural times in accordance with the imaging instruction, blackout is caused to occur in the display unit during a period from a start of the exposure by a first drive control among the drive controls of the plural times to a start of displaying the first image, and the second image is continuously displayed in the display unit during a period from a start of the exposure by second and the subsequent drive controls among the drive controls of the plural times to a start of displaying the first image.

(25) In the imaging method in any one of (16) to (24), in the drive control step, the imaging signal is read out from the photoelectric conversion unit included in a plurality of the pixel rows in each of the plurality of field periods, and the pixel row in which the imaging signal is read out from the imaging element in the first field period is adjacent to the pixel row in which the imaging signal is read out from the imaging element in the next field period.

(26) In the imaging method in any one of (16) to (25), in the drive control step, a live-view drive control in which the photoelectric conversion unit group is exposed, and an imaging signal which has been photoelectrically converted by the photoelectric conversion unit of 1/N of all the photoelectric conversion units included in the photoelectric conversion unit group during the exposure is read out from the imaging element is performed in a not-storing period other than the period in which the drive control is performed, wherein N is a natural number, and the number of the plurality of field periods in the drive control performed in accordance with the imaging instruction is equal to N.

(27) In the imaging method in any one of (16) to (26), all the photoelectric conversion units included in the imaging element are arranged in accordance with a Bayer pattern, and the number of the plurality of field periods in the drive control performed in accordance with the imaging instruction is an odd number of 3 or more.

(28) In the imaging method in (27), the plurality of pixel rows includes a pixel row including a pair of the first photoelectric conversion unit and the second photoelectric conversion unit and a pixel row including only the third photoelectric conversion unit. In a case where the number of the plurality of field periods is set as n, and m is set as a natural number of 2 or more, the pixel row including the pair is disposed at every $\{(n \times m)-1\}$ rows.

(29) In the imaging method in any one of (16) to (26), all the photoelectric conversion units included in the imaging element are arranged in accordance with a specific pattern. In the specific pattern, a first unit and a second unit are arranged in the one direction and a direction perpendicular to the one direction to be checkered. Each of the first unit and the second unit includes five fourth photoelectric conversion units that receive light of a first color which contributes most to a brightness component, two fifth photoelectric conversion units that receive light of a second color different from the first color, and two sixth photoelectric conversion units that receive light of a third color different from the first color and the second color. The first unit has a configuration in which a first row, a second row, and the first row are arranged in the direction perpendicular to the one direction. In the first row, the fourth photoelectric conversion unit, the fifth photoelectric conversion unit, and the fourth photoelectric conversion unit are arranged in the one direction. In the second row, the sixth photoelectric conversion unit, the fourth photoelectric conversion unit, and the sixth photoelectric conversion unit are arranged in the one direction. The second unit has a configuration in which a third row, a fourth row, and the third row are arranged in the direction perpendicular to the one direction. In the third row, the fourth photoelectric conversion unit, the sixth photoelectric conversion unit, and the fourth photoelectric conversion unit are arranged in the one direction. In the fourth row, the fifth photoelectric conversion unit, the fourth photoelectric conversion unit, and the fifth photoelectric conversion unit are arranged in the one direction. The number of the plurality of field periods in the drive control performed in accordance with the imaging instruction is an even number.

(30) In the imaging method in (29), the plurality of pixel rows includes a pixel row including a pair of the first photoelectric conversion unit and the second photoelectric conversion unit and a pixel row including only the third photoelectric conversion unit. In a case where the number of the plurality of field periods is set as n, and m is set as a natural number of 2 or more, the pixel row including the pair is disposed at every $\{(n \times m)-1\}$ rows.

(31) There is provided an imaging program which is used for imaging a subject with an imaging element which has a light reception surface in which a plurality of pixel rows including a plurality of photoelectric conversion units arranged in one direction is arranged in a direction perpendicular to the one direction, the plurality of pixel rows including a plurality of first photoelectric conversion units receiving one of a pair of luminance fluxes, a plurality of second photoelectric conversion units receiving the other of the pair of luminance fluxes, and a plurality of third photoelectric conversion units receiving both of the pair of luminance fluxes, the pair of luminance fluxes passing through portions which are different from each other and are arranged in one direction of a pupil region in an imaging optical system including a focus lens. The program causes a computer to execute: a drive control step of performing, in accordance with an imaging instruction, a drive control of exposing a photoelectric conversion unit group including the plurality of first photoelectric conversion units, the plurality of second photoelectric conversion units, and the plurality of third photoelectric conversion units, and reading out an imaging signal group from the imaging element in a plurality of field periods, the imaging signal group including an imaging signal which has been photoelectrically converted in each of the plurality of first photoelectric conversion units by the exposure, an imaging signal which has been photoelectrically converted in each of the plurality of second photoelectric conversion units by the exposure, and an imaging signal which has been photoelectrically converted in each of the plurality of third photoelectric conversion units by the exposure, an imaging processing step of processing the imaging signal group read out from the imaging element so as to generate captured image data and storing the captured image data in a storage medium, a display-image data generation step of processing a first imaging signal group read out from the imaging element in a first field period among the plurality of field periods, so as to generate first display image data and processing a second imaging signal group read out from the imaging element in a field period next to the first field period, so as to generate second display image data, and a display control step of displaying a first image based on the first display image data in the display unit and then changes the first image to a second image based on the second display image data. In the drive control step, imaging signals are read out from a plurality of pairs including the first photoelectric conversion units and the second photoelectric conversion units and a plurality of the third photoelectric conversion units in the first field period, and imaging signals are read out from a plurality of the third photoelectric conversion units in the next field period.

According to the present invention, it is possible to provide an imaging device, an imaging method, and an imaging program in which it is possible to store captured image data having a high resolution and to allow immediate checking of the captured image data in the display unit.

Although the present invention has been described with reference to specific embodiments, the present invention is not limited to the embodiments, and various modifications are possible without departing from the technical spirit of the disclosed invention.

This application is based on Japanese patent application (Japanese Patent Application No. 2016-219037) filed Nov. 9, 2016, the content of which is incorporated herein.

EXPLANATION OF REFERENCES

100: digital camera
1: imaging lens
2: aperture
3: mechanical shutter
4: lens control unit
5: imaging element
6: shutter driving unit
8: lens driving unit
9: aperture driving unit
40: lens device
10: imaging element driving unit
11: system control unit
11A: drive control unit
11B: focus control unit
14: operation unit
17: digital signal processing unit
17A: image processing unit
17B: display-image data generation unit
17C: display control unit
20: external memory control unit
21: storage medium
22: display driver
23: display unit
24: control bus
25: data bus
60: light reception surface
61: pixel
62: pixel row
63: driving circuit
64: signal processing circuit
X: row direction
Y: column direction
F1 to F5: field
f1, f2: pixel group
61$r$, 61$g$, 61$b$: imaging pixel
61R, 61L: phase-difference detection pixel
P: pair
PL: phase-difference detection pixel row
R1, R2: straight line indicating reset timing
f1$a$: straight line indicating readout timing of imaging signal from field F1
f2$a$: straight line indicating readout timing of imaging signal from field F2
f3$a$: straight line indicating readout timing of imaging signal from field F3
f4$a$: straight line indicating readout timing of imaging signal from field F4
f5$a$: straight line indicating readout timing of imaging signal from field F5
BO: straight line indicating display stop timing
DR, DR1, DR2: straight line indicating drawing timing
LV: live-view sequence
EX: still-image exposing sequence
RE: still-image reading sequence
U1, U2: unit
200: smartphone
201: casing
202: display panel
203: operation panel
204: display input unit
205: speaker
206: microphone
207: operation unit
208: camera unit
210: radio communication unit
211: call unit
212: storage unit
213: external input and output unit
214: GPS reception unit
215: motion sensor unit
216: power supply unit
217: internal storage unit
218: external storage unit
220: main control unit
ST1 to STn: GPS satellite

What is claimed is:

1. An imaging device comprising:

an imager which has a light reception surface in which a plurality of pixel rows comprising a plurality of photoelectric converters arranged in one direction is arranged in a direction perpendicular to the one direction, the plurality of pixel rows comprising a plurality of first photoelectric converters receiving one of a pair of luminance fluxes, a plurality of second photoelectric converters receiving other of the pair of luminance fluxes, and a plurality of third photoelectric converters receiving both of the pair of luminance fluxes, the pair of luminance fluxes passing through portions which are different from each other and are arranged in one direction of a pupil region in an imaging optical system including a focus lens;

a drive controller that performs, in accordance with an imaging instruction, a drive control of exposing a photoelectric converter group comprising the plurality of first photoelectric converters, the plurality of second photoelectric converters and the plurality of third photoelectric converters, and reading out an imaging signal group from the imager in a plurality of field periods, the imaging signal group comprising an imaging signal which has been photoelectrically converted in each of the plurality of first photoelectric converters by the exposing, an imaging signal which has been photoelectrically converted in each of the plurality of second photoelectric converters by the exposing, and an imaging signal which has been photoelectrically converted in each of the plurality of third photoelectric converters by the exposing;

an image processor that processes the imaging signal group read out from the imager so as to generate captured image data and stores the captured image data in a storage medium;

a display-image data generator that processes a first imaging signal group read out from the imager in a first field period among the plurality of field periods, so as to generate first display image data and processes a second imaging signal group read out from the imager in a field period next to the first field period, so as to generate second display image data; and a display controller that displays a first image based on the first display image data in a display and then changes the first image to a second image based on the second display image data, wherein the drive controller reads out imaging signals from a plurality of pairs including the first photoelectric converters and the second photoelectric converters and a plurality of the third photoelectric converters in the first field period and reads out imaging signals from a plurality of the third photoelectric converters in the next field period.

2. The imaging device according to claim 1,
wherein the display-image data generator performs signal processing on the first imaging signal group and generates the first display image data based on the first imaging signal group subjected to the signal processing, the signal processing being performed so that each of a first imaging signal read out from the first photoelectric converter and a second imaging signal read out from the second photoelectric converter in the first imaging signal group is treated as being read out from the third photoelectric converter.

3. The imaging device according to claim 2,
wherein the signal processing is processing in which the first imaging signal is replaced with an imaging signal read out from the third photoelectric converter around the first photoelectric converter as a source for reading out the first imaging signal or with an imaging signal generated based on the imaging signal, and the second imaging signal is replaced with an imaging signal read out from the third photoelectric converter around the second photoelectric converter as a source for reading out the second imaging signal or with an imaging signal generated based on the imaging signal.

4. The imaging device according to claim 2,
wherein the signal processing is processing in which the first imaging signal is multiplied by a gain, and the second imaging signal is multiplied by a gain.

5. The imaging device according to claim 1,
wherein the drive controller reads out imaging signals from all pairs of the first photoelectric converters and the second photoelectric converters and a plurality of the third photoelectric converters in the first field period.

6. The imaging device according to claim 1,
wherein the drive controller
reads out the imaging signal group in three or more field periods,
reads out imaging signals from some of all pairs of the first photoelectric converters and the second photoelectric converters and a plurality of the third photoelectric converters in a first field period of the three or more field periods,
reads out imaging signals from a plurality of the third photoelectric converters in a second field period of the three or more field periods, and
reads out imaging signals from remaining pairs of the all pairs of the first photoelectric converters and the second photoelectric converters and remaining third photoelectric converters in third and subsequent field periods of the three or more field periods.

7. The imaging device according to claim 1, further comprising:
a focus controller that performs a focus control of the imaging optical system by controlling the focus lens based on a first imaging signal read out from the first photoelectric converter and a second imaging signal read out from the second photoelectric converter in the first imaging signal group before reading of the imaging signal group from the imager is completed.

8. The imaging device according to claim 1,
wherein a continuous shooting mode in which the drive control is consecutively performed plural times in accordance with the imaging instruction is provided, and
the display controller causes blackout to occur in the display during a period from a start of the exposing by each of the drive controls of the plural times to a start of displaying the first image, in the continuous shooting mode.

9. The imaging device according to claim 1,
wherein a continuous shooting mode in which the drive control is consecutively performed plural times in accordance with the imaging instruction is provided, and
the display controller causes blackout to occur in the display during a period from a start of the exposing by a first drive control among the drive controls of the plural times to a start of displaying the first image and continuously displays the second image in the display during a period from a start of the exposing by second and subsequent drive controls among the drive controls of the plural times to a start of displaying the first image, in the continuous shooting mode.

10. The imaging device according to claim 1,
wherein the drive controller reads out imaging signals from the photoelectric converters included in a plurality of the pixel rows in each of the plurality of field periods, and
the pixel row in which the imaging signal is read out from the imager in the first field period is adjacent to the pixel row in which the imaging signal is read out from the imager in the next field period.

11. The imaging device according to claim 1,
wherein the drive controller performs a live-view drive control of exposing the photoelectric converter group and reading out, from the imager, an imaging signal which has been photoelectrically converted by 1/N of all the photoelectric converters included in the photoelectric converter group during the exposing, in a not-storing period other than the period in which the drive control is performed, wherein N is a natural number, and the number of the plurality of field periods in the drive control performed in accordance with the imaging instruction is equal to N.

12. The imaging device according to claim 1, wherein all the photoelectric converters included in the imager are arranged in accordance with a Bayer pattern, and the number of the plurality of field periods in the drive control performed in accordance with the imaging instruction is an odd number of 3 or more.

13. The imaging device according to claim 12, wherein the plurality of pixel rows comprises a pixel row including a pair of the first photoelectric converter and the second photoelectric converter and a pixel row including only the third photoelectric converter, and in a case where the number of the plurality of field periods is set as n, and m is set as a natural number of 2 or more, the pixel row including the pair is disposed at every {(n×m)−1} rows.

14. The imaging device according to claim 1, wherein all the photoelectric converters included in the imager are arranged in accordance with a specific pattern, in the specific pattern, a first unit and a second unit are arranged in a check pattern in the one direction and a direction perpendicular to the one direction, each of the first unit and the second unit including five fourth photoelectric converters that receive light of a first color contributing to a brightness component most, two fifth photoelectric converters that receive light of a second color different from the first color, and two sixth photoelectric converters that receive light of a third color different from the first color and the second color, the first unit has a configuration in which a first row, a second row, and the first row are arranged in a direction perpendicular to the one direction, in the first row, the fourth photoelectric converter, the fifth photoelectric converter, and the fourth photoelectric converter are arranged in the one direction, and in the second row, the sixth photoelectric converter, the fourth photoelectric converter, and the sixth photoelectric converter are arranged in the one direction, the second unit has a configuration in which a third row, a fourth row, and the third row are arranged in a direction perpendicular to the one direction, in the third row, the fourth photoelectric converter, the sixth photoelectric converter, and the fourth photoelectric converter are arranged in the one direction, and in the fourth row, the fifth photoelectric converter, the fourth photoelectric converter, and the fifth photoelectric converter are arranged in the one direction, and the number of the plurality of field periods in the drive control performed in accordance with the imaging instruction is an even number of 2 or more.

15. The imaging device according to claim 14, wherein the plurality of pixel rows includes a pixel row including a pair of the first photoelectric converter and the second photoelectric converter and a pixel row including only the third photoelectric converter, and in a case where the number of the plurality of field periods is set as n, and m is set as a natural number of 2 or more, the pixel row including the pair is disposed at every {(n×m)−1} rows.

16. An imaging method of imaging a subject with an imager which has a light reception surface in which a plurality of pixel rows including a plurality of photoelectric converters arranged in one direction is arranged in a direction perpendicular to the one direction, the plurality of pixel rows including a plurality of first photoelectric converters receiving one of a pair of luminance fluxes, a plurality of second photoelectric converters receiving other of the pair of luminance fluxes, and a plurality of third photoelectric converters receiving both of the pair of luminance fluxes, the pair of luminance fluxes passing through portions which are different from each other and are arranged in one direction of a pupil region in an imaging optical system including a focus lens, the method comprising:

a drive control step of performing, in accordance with an imaging instruction, a drive control of exposing a photoelectric converter group including the plurality of first photoelectric converters, the plurality of second photoelectric converters, and the plurality of third photoelectric converters, and reading out an imaging signal group from the imager in a plurality of field periods, the imaging signal group including an imaging signal which has been photoelectrically converted in each of the plurality of first photoelectric converters by the exposing, an imaging signal which has been photoelectrically converted in each of the plurality of second photoelectric converters by the exposing, and an imaging signal which has been photoelectrically converted in each of the plurality of third photoelectric converters by the exposing;

an imaging processing step of processing the imaging signal group read out from the imager so as to generate captured image data and storing the captured image data in a storage medium;

a display-image data generation step of processing a first imaging signal group read out from the imager in a first field period among the plurality of field periods, so as to generate first display image data and processing a second imaging signal group read out from the imager in a field period next to the first field period, so as to generate second display image data; and a display control step of displaying a first image based on the first display image data in a display and then changing the first image to a second image based on the second display image data, wherein in the drive control step, imaging signals are read out from a plurality of pairs including the first photoelectric converters and the second photoelectric converters and a plurality of the third photoelectric converters in the first field period, and imaging signals are read out from a plurality of the third photoelectric converters in the next field period.

17. The imaging method according to claim 16, wherein, in the display-image data generation step, signal processing is performed on the first imaging signal group, and the first display image data is generated based on the first imaging signal group subjected to the signal processing, the signal processing being performed so that each of a first imaging signal read out from the first photoelectric converter and a second imaging signal read out from the second photoelectric converter in the first imaging signal group is treated as being read out from the third photoelectric converter.

18. The imaging method according to claim 17,
wherein the signal processing is processing in which the first imaging signal is replaced with an imaging signal read out from the third photoelectric converter around the first photoelectric converter as a source for reading out the first imaging signal or with an imaging signal generated based on the imaging signal, and the second imaging signal is replaced with an imaging signal read out from the third photoelectric converter around the second photoelectric converter as a source for reading out the second imaging signal or with an imaging signal generated based on the imaging signal.

19. The imaging method according to claim 17,
wherein the signal processing is processing in which the first imaging signal is multiplied by a gain, and the second imaging signal is multiplied by a gain.

20. The imaging method according to claim 16,
wherein in the drive control step, imaging signals are read out from all pairs of the first photoelectric converters and the second photoelectric converters and a plurality of the third photoelectric converters in the first field period.

21. The imaging method according to claim 16,
wherein in the drive control step, the imaging signal group is read out in three or more field periods,
imaging signals are read out from some of all pairs of the first photoelectric converters and the second photoelectric converters and a plurality of the third photoelectric converters in a first field period of the three or more field periods,
imaging signals are read out from a plurality of the third photoelectric converters in a second field period of the three or more field periods, and
imaging signals are read out from remaining pairs of the all pairs of the first photoelectric converters and the second photoelectric converters and remaining third photoelectric converters in a third and subsequent field periods of the three or more field periods.

22. The imaging method according to claim 16, further comprising:
a focus control step of performing a focus control of the imaging optical system by controlling the focus lens based on a first imaging signal read out from the first photoelectric converter and a second imaging signal read out from the second photoelectric converter in the first imaging signal group before reading of the imaging signal group from the imager is completed.

23. The imaging method according to claim 16,
wherein, in the display control step, in a continuous shooting mode in which the drive control is consecutively performed plural times in accordance with the imaging instruction, blackout is caused to occur in the display during a period from a start of the exposing by each of the drive controls of the plural times to a start of displaying the first image.

24. The imaging method according to claim 16,
wherein, in the display control step, in a continuous shooting mode in which the drive control is consecutively performed plural times in accordance with the imaging instruction, blackout is caused to occur in the display during a period from a start of the exposing by a first drive control among the drive controls of the plural times to a start of displaying the first image, and the second image is continuously displayed in the display during a period from a start of the exposing by second and subsequent drive controls among the drive controls of the plural times to a start of displaying the first image.

25. The imaging method according to claim 16,
wherein, in the drive control step, imaging signals are read out from the photoelectric converters included in a plurality of the pixel rows in each of the plurality of field periods, and
the pixel row in which the imaging signal is read out from the imager in the first field period is adjacent to the pixel row in which the imaging signal is read out from the imager in the next field period.

26. The imaging method according to claim 16,
wherein, in the drive control step, a live-view drive control in which the photoelectric converter group is exposed, and an imaging signal which has been photoelectrically converted by 1/N of all the photoelectric converters included in the photoelectric converter group during the exposing is read out from the imager is performed in a not-storing period other than the period in which the drive control is performed, wherein N is a natural number, and
the number of the plurality of field periods in the drive control performed in accordance with the imaging instruction is equal to N.

27. The imaging method according to claim 16,
wherein all the photoelectric converters included in the imager are arranged in accordance with a Bayer pattern, and
the number of the plurality of field periods in the drive control performed in accordance with the imaging instruction is an odd number of 3 or more.

28. The imaging method according to claim 27,
wherein the plurality of pixel rows includes a pixel row including a pair of the first photoelectric converter and the second photoelectric converter and a pixel row including only the third photoelectric converter, and
in a case where the number of the plurality of field periods is set as n, and m is set as a natural number of 2 or more, the pixel row including the pair is disposed at every {(n×m)−1} rows.

29. The imaging method according to claim 16,
wherein all the photoelectric converters included in the imager are arranged in accordance with a specific pattern,
in the specific pattern, a first unit and a second unit are arranged in a check pattern in the one direction and a direction perpendicular to the one direction, each of the first unit and the second unit including five fourth photoelectric converters that receive light of a first color contributing to a brightness component most, two fifth photoelectric converters that receive light of a second color different from the first color, and two sixth photoelectric converters that receive light of a third color different from the first color and the second color,
the first unit has a configuration in which a first row, a second row, and the first row are arranged in a direction perpendicular to the one direction, in the first row, the fourth photoelectric converter, the fifth photoelectric converter, and the fourth photoelectric converter are arranged in the one direction, and in the second row, the sixth photoelectric converter, the fourth photoelectric converter, and the sixth photoelectric converter are arranged in the one direction,
the second unit has a configuration in which a third row, a fourth row, and the third row are arranged in a direction perpendicular to the one direction, in the third row, the fourth photoelectric converter, the sixth photoelectric converter, and the fourth photoelectric converter are arranged in the one direction, and in the fourth row, the fifth photoelectric converter, the fourth photoelectric converter, and the fifth photoelectric converter are arranged in the one direction, and the number of the plurality of field periods in the drive control performed in accordance with the imaging instruction is an even number of 2 or more.

30. The imaging method according to claim 29,
wherein the plurality of pixel rows includes a pixel row including a pair of the first photoelectric converter and the second photoelectric converter and a pixel row including only the third photoelectric converter, and in a case where the number of the plurality of field periods is set as n, and m is set as a natural number of 2 or more, the pixel row including the pair is disposed at every $\{(n \times m)-1\}$ rows.

31. A non-transitory computer readable medium storing an imaging program for imaging a subject with an imager which has a light reception surface in which a plurality of pixel rows including a plurality of photoelectric converters arranged in one direction is arranged in a direction perpendicular to the one direction, the plurality of pixel rows including a plurality of first photoelectric converters receiving one of a pair of luminance fluxes, a plurality of second photoelectric converters receiving other of the pair of luminance fluxes, and a plurality of third photoelectric converters receiving both of the pair of luminance fluxes, the pair of luminance fluxes passing through portions which are different from each other and are arranged in one direction of a pupil region in an imaging optical system including a focus lens, the program causing a computer to execute:

a drive control step of performing, in accordance with an imaging instruction, a drive control of exposing a photoelectric converter group including the plurality of first photoelectric converters, the plurality of second photoelectric converters, and the plurality of third photoelectric converters, and reading out an imaging signal group from the imager in a plurality of field periods, the imaging signal group including an imaging signal which has been photoelectrically converted in each of the plurality of first photoelectric converters by the exposing, an imaging signal which has been photoelectrically converted in each of the plurality of second photoelectric converters by the exposing, and an imaging signal which has been photoelectrically converted in each of the plurality of third photoelectric converters by the exposing;

an imaging processing step of processing the imaging signal group read out from the imager so as to generate captured image data and storing the captured image data in a storage medium;

a display-image data generation step of processing a first imaging signal group read out from the imager in a first field period among the plurality of field periods, so as to generate first display image data and processing a second imaging signal group read out from the imager in a field period next to the first field period, so as to generate second display image data; and a display control step of displaying a first image based on the first display image data in a display and then changes the first image to a second image based on the second display image data, wherein in the drive control step, imaging signals are read out from a plurality of pairs including the first photoelectric converters and the second photoelectric converters and a plurality of the third photoelectric converters in the first field period, and imaging signals are read out from a plurality of the third photoelectric converters in the next field period.

* * * * *